US011623638B2

(12) United States Patent
Smith

(10) Patent No.: US 11,623,638 B2
(45) Date of Patent: Apr. 11, 2023

(54) SYSTEMS AND METHODS TO ADDRESS JACKKNIFING IN AUTONOMOUS VEHICLES

(71) Applicant: Waymo LLC, Mountain View, CA (US)

(72) Inventor: David Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 408 days.

(21) Appl. No.: 16/888,961

(22) Filed: Jun. 1, 2020

(65) Prior Publication Data

US 2021/0370922 A1   Dec. 2, 2021

(51) Int. Cl.
*B60W 30/09* (2012.01)
*B60W 30/18* (2012.01)
*B60W 10/18* (2012.01)
*B60W 60/00* (2020.01)

(52) U.S. Cl.
CPC ......... *B60W 30/09* (2013.01); *B60W 10/18* (2013.01); *B60W 30/18109* (2013.01); *B60W 60/0016* (2020.02); *B60W 2554/4041* (2020.02); *B60W 2554/4046* (2020.02); *B60Y 2200/147* (2013.01); *B60Y 2300/28* (2013.01)

(58) Field of Classification Search
CPC ............. B60W 10/18; B60W 30/09; B60W 30/18109; B60W 2300/126; B60W 2300/14; B60T 7/20; B60Y 2200/147; B60Y 2300/28
See application file for complete search history.

(56) References Cited

U.S. PATENT DOCUMENTS

| 5,690,347 A | 11/1997 | Juergens et al. |
| 6,838,979 B2 | 1/2005 | Deng et al. |
| 6,854,557 B1 | 2/2005 | Deng et al. |
| 8,275,516 B2 | 9/2012 | Murphy |
| 8,825,328 B2 | 9/2014 | Rupp et al. |
| 9,340,228 B2 | 5/2016 | Xu et al. |

(Continued)

FOREIGN PATENT DOCUMENTS

WO   2018086764 A1   5/2018

OTHER PUBLICATIONS

Bejar, Eduardo, et al., Backing Up Control of a Self-Driving Truck-Trailer Vehicle with Deep Reinforcement Learning and Fuzzy Logic, Research Gate, 2019, pp. 1-19.

(Continued)

*Primary Examiner* — Anshul Sood
(74) *Attorney, Agent, or Firm* — Botos Churchill IP Law

(57) ABSTRACT

The technology relates to articulated autonomous vehicles that can potentially jackknife. To avoid or mitigate such hazardous conditions, the current state of the vehicle is evaluated against the vehicle's planned trajectory, for instance as it drives along a freeway or surface streets. When the evaluation indicates a likelihood of jackknifing, an automated braking approach is implemented using elective braking to stabilize the vehicle. The braking approach can depend on whether the situation involves tractor jackknifing or trailer jackknifing, and one or more different braking mechanisms can be employed for a selective modulation of the braking profile to address actual jackknifing or to prevent the vehicle from entering a jackknifing situation.

20 Claims, 16 Drawing Sheets

(56) References Cited

U.S. PATENT DOCUMENTS

| | | | |
|---|---|---|---|
| 9,566,911 B2 | 2/2017 | Greenwood et al. | |
| 9,926,008 B2* | 3/2018 | Hafner | B62D 13/06 |
| 10,054,947 B2 | 8/2018 | Mays | |
| 10,279,839 B2* | 5/2019 | Lavoie | B62D 13/06 |
| 2006/0244579 A1* | 11/2006 | Raab | B60W 10/04 340/438 |
| 2010/0198491 A1 | 8/2010 | Mays | |
| 2014/0249691 A1 | 9/2014 | Hafner et al. | |
| 2014/0277941 A1* | 9/2014 | Chiu | B62D 13/06 701/41 |
| 2015/0165850 A1 | 6/2015 | Chiu et al. | |
| 2017/0008560 A1* | 1/2017 | Kyrtsos | B60W 10/20 |
| 2017/0123431 A1* | 5/2017 | Ghneim | G06V 20/56 |
| 2018/0154888 A1 | 6/2018 | Buchner et al. | |

OTHER PUBLICATIONS

Beyersdorfer, Susann, et al., Novel Model Based Path Planning for Multi-Axle Steered Heavy Load Vehicles, Proceedings of the 16th International IEEE Annual Conference on Intelligent Transportation Systems (ITSC 2013), The Hague, The Netherlands, Oct. 6-9, 2013, pp. 424-429.

Cariou, Christophe, et al., Autonomous maneuver of a farm vehicle with a trailed implement: motion planner and lateral-longitudinal controllers, 2010 IEEE International Conf. on Robotics and Automation Anchorage Convention District 2010, pp. 3819-3824.

Currier, Patrick Norman, A Method for Modeling and Prediction of Ground Vehicle Dynamics and Stability in Autonomous Systems, 2011, pp. 1-229.

Hejase, Mohammad, et al., Constrained Backward Path Tracking Control using a Plug-in Jackknife Prevention System for Autonomous Tractor-Trailers, Research Gate, Nov. 2018, pp. 1-7.

Khalaji, Ali Keymasi, et al., Robust Adaptive Controller for a Tractor-Trailer Mobile Robot, IEEE/ASME Transactions on Mechatronics, vol. 19, No. 3, Jun. 2014, pp. pp. 943-953.

Li, Bai, et al., Time-Optimal Trajectory Planning for Tractor-Trailer Vehicles via Simultaneous Dynamic Optimization, 2015 IEEE/RSJ International Conference on Intelligent Robots and Systems (IROS), pp. 3844-3849.

Ljungqvist, Oskar, et al., On sensing-aware model predictive path-following control for a reversing general 2-trailer with a car-like tractor, arXiv:2002.06874v3, Feb. 2020, pp. 1-19.

Michalek, Maciej Marcin, et al., Forward tracking of complex trajectories with non-Standard N-Trailers of non-minimum-phase kinematics avoiding a jackknife effect, International Journal of Control, 2019, vol. 92, No. 11, 2547-2560.

Quartuccio, James Nathan, Autonomous Tractor-Trailer Stopping and Jackknifing Dynamics, Copyright 2017, pp. 1-82.

Stahn, Roland, et al., Laser Scanner-Based Navigation and Motion Planning for Truck-Trailer Combinations, IEEE, 2007, pp. 1-6.

Stahn, Roland, et al., Laser Scanner-Based Navigation for Commercial Vehicles, Proceedings of the 2007 IEEE Intelligent Vehicles Symposium Istanbul, Turkey, Jun. 13-15, 2007, pp. 969-974.

Yurtsever, Ekim, et al., A Survey of Autonomous Driving; Common Practices and Emerging Technologies, arXiv: 1906.05113v2, Jan. 2020, pp. 1-26.

* cited by examiner

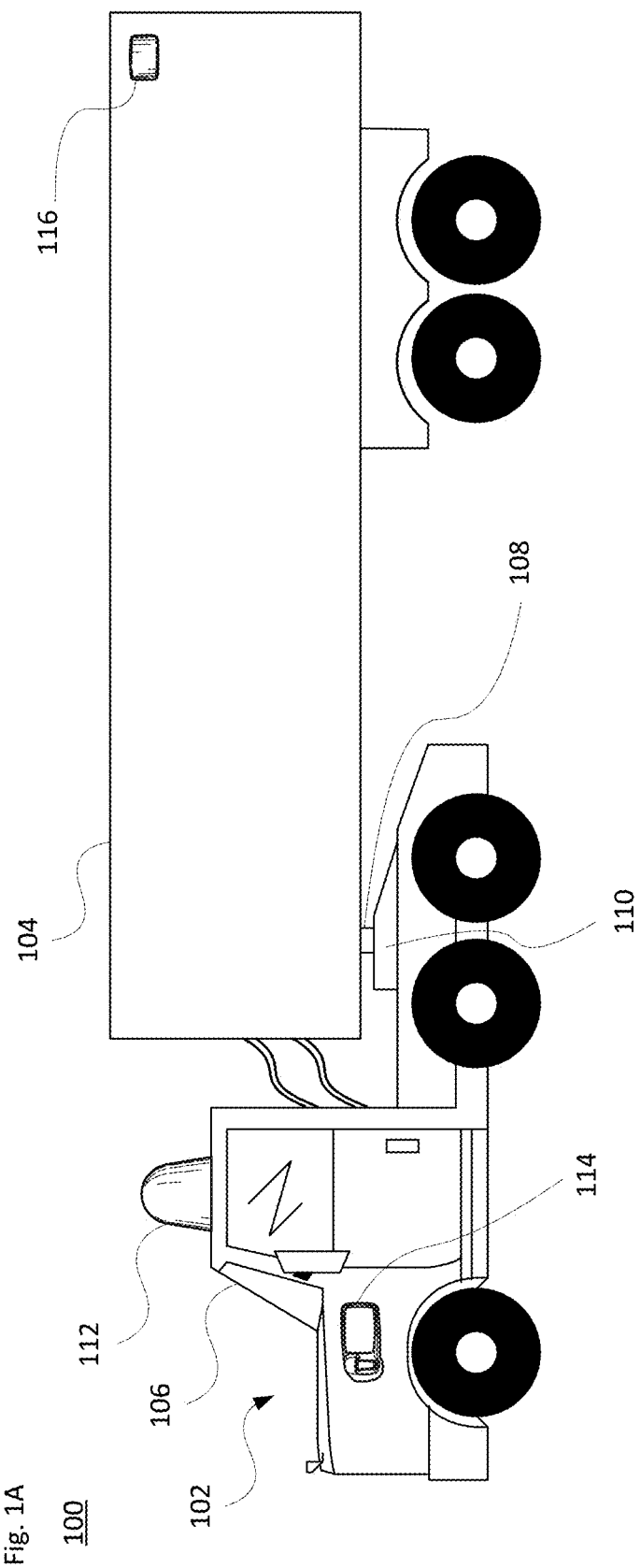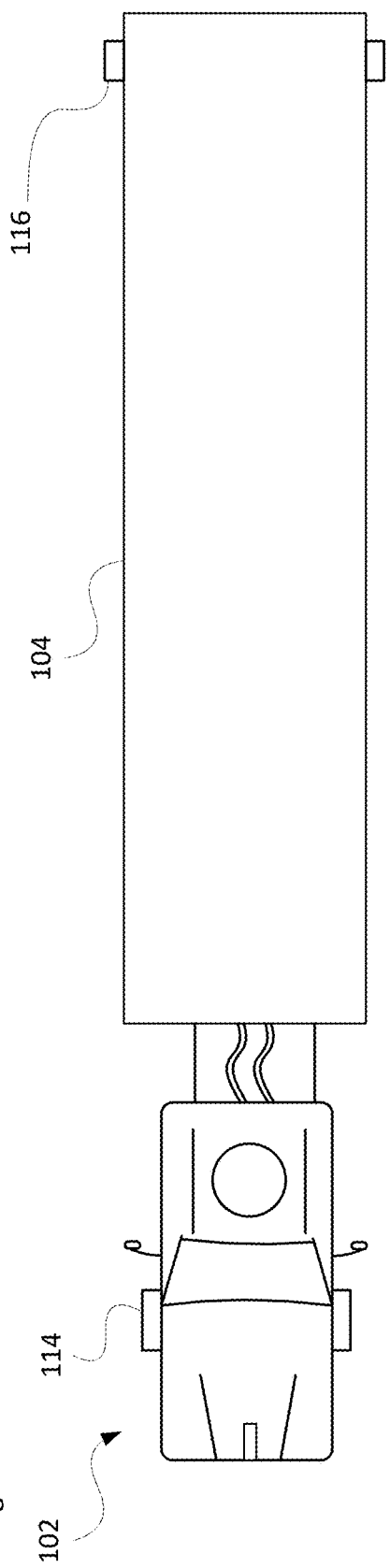

400

410
412

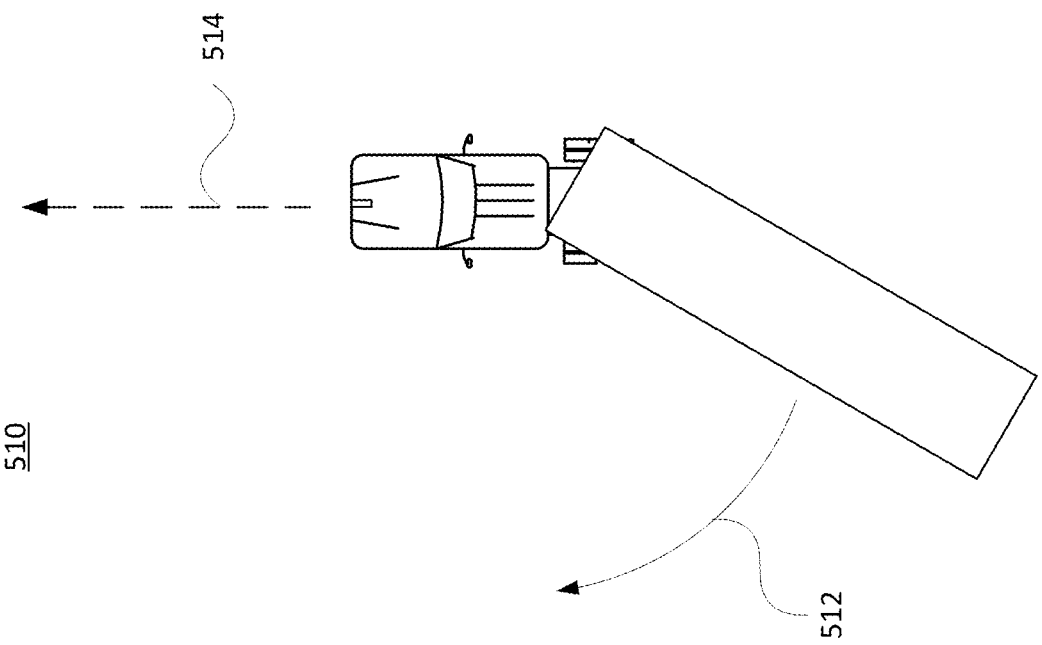
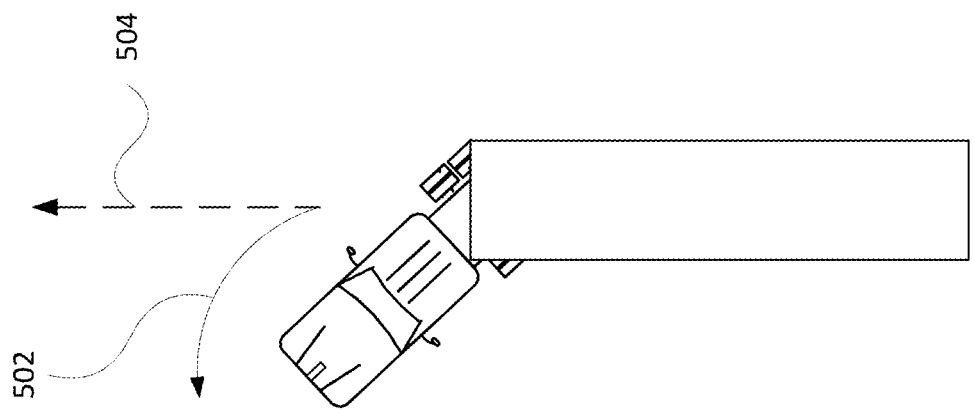

610

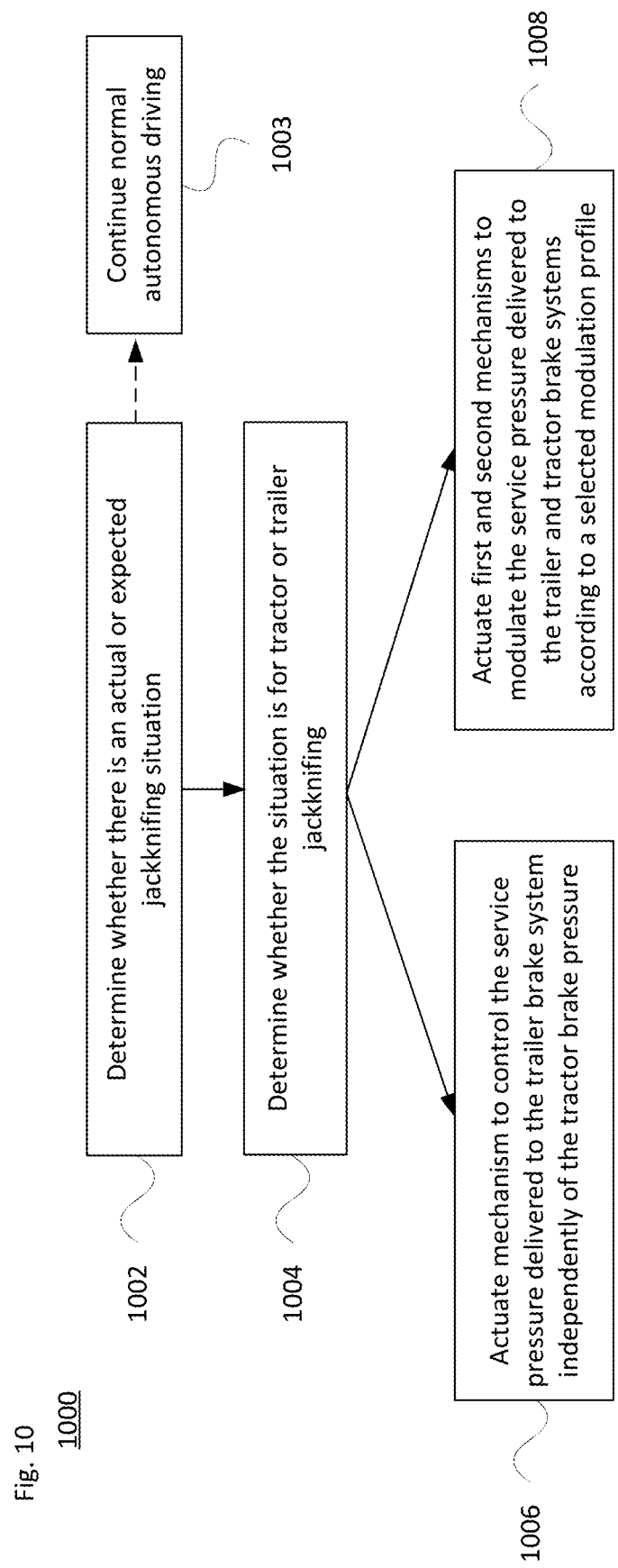

SYSTEMS AND METHODS TO ADDRESS JACKKNIFING IN AUTONOMOUS VEHICLES

BACKGROUND

Autonomous vehicles can be used to aid in the transport of cargo or passengers from one location to another. Such vehicles may operate in a fully autonomous mode, or a partially autonomous mode where a person may provide some driving input. Large self-driving vehicles such as tractor-trailer trucks, buses, fire trucks and other vehicles that articulate may have a hinge or pivot connection between different parts of the vehicle, such as the fifth-wheel and kingpin coupling between a tractor and a trailer. Jackknifing situations may occur when the different parts of the vehicle move in relation to one another in an unintended manner. For instance, either the tractor or the trailer may swing around the articulation point (e.g., the fifth-wheel), which can result in a lane departure or even irrevocable loss of control of the vehicle.

BRIEF SUMMARY

The technology relates to articulated autonomous vehicles. In one aspect, the real-time state of the vehicle is evaluated using information from onboard sensors compared against the vehicle's planned trajectory, for instance as it drives along a freeway or surface streets. When the evaluation indicates a likelihood of jackknifing, an automated braking approach is implemented in which selective braking is used to stabilize the vehicle. The braking approach can depend on whether the situation involves tractor jackknifing or trailer jackknifing.

According to one aspect of the technology, an articulated vehicle is configured to operate in an autonomous driving mode. The articulated vehicle comprises a driving system, a perception system and a control system. The driving system includes a steering subsystem, an acceleration subsystem and a deceleration subsystem to control driving of the vehicle in the autonomous driving mode. The perception system includes one or more sensors configured to detect objects in an environment surrounding the vehicle based on obtained sensor data, with each of the one or more sensors being positioned along the vehicle. The control system is operatively connected to the driving system and the perception system. The control system has one or more computer processors configured to receive sensor data from the perception system. The sensor data is associated with information regarding different parts of the vehicle. The one or more computer processors are also configured to determine a current behavior of the vehicle based on the received sensor data. The current behavior indicates an orientational relationship between the different parts of the vehicle. The one or more computer processors are further configured to determine an expected behavior of the vehicle based on at least on a model of the vehicle and a planned route and compare the expected behavior to the current behavior to identify whether there is a match. Upon a determination that there is no match between the expected behavior and the current behavior, it is determined whether there is an actual or expected jackknifing situation. The processors are configured to determine a type of the jackknifing situation, based on the type of the jackknifing situation select one or more mechanisms of the deceleration system to cause vehicle braking, and actuate the one or more mechanisms to cause the vehicle braking.

In one example, the articulated vehicle is a cargo vehicle having a tractor and at least one trailer pivotally coupled to the tractor. In another example, the determination that there is no match includes a determination that the expected behavior deviates beyond a threshold amount from the current behavior. In a further example, the determination of the type of jackknifing situation is a determination of either a tractor jackknifing situation or a trailer jackknifing situation.

In yet another example, the determination of the expected behavior of the vehicle is further based on at least one of map information, weather information, one or more driving commands, or a desired vehicle state. The one or more driving commands may be analyzed over a selected period of time. The desired vehicle state may include at least one of a planned speed or a planned vehicle pose for a road segment.

In a further example, the one or more mechanisms of the deceleration system are configured to cause the vehicle braking to address a trailer jackknifing situation, and the one or more mechanisms includes at least two pneumatic input ports that are connected to a trailer service line and a trailer supply, and at least one pneumatic output port that is connected to the trailer service line.

The one or more mechanisms of the deceleration system may comprise a pair of mechanisms that are configured to cause the vehicle braking to address a trailer jackknifing situation, and the pair of mechanisms has first and second mechanisms. The first mechanism includes at least two pneumatic input ports that are connected to a trailer service line and a trailer supply, and at least one pneumatic output port that is connected to the trailer service line. The second mechanism includes (i) at least four pneumatic input ports that are connected to primary and secondary outputs of a treadle valve, a primary reservoir and a secondary reservoir, and (ii) at least two pneumatic output ports that are connected to primary and secondary brake circuits. The first and second mechanisms are configured to modulate service pressure delivered to a trailer brake system of the deceleration subsystem independently of tractor brake pressure. The first and second mechanisms may be configured for serial operation to modulate the service pressure in response to a tractor jackknifing situation. The modulation can include any of (1) stopping brake pressure the trailer, (2) reduce the brake pressure to the trailer, or (3) using a selected signal shape for the pressure.

The control system may be further configured to determine a desired pressure for trailer braking of the deceleration subsystem based on wheel speeds of one or more trailer tires. In this case, the control system may be further configured to observe locking of the one or more trailer tires lock, and cause the deceleration subsystem to dump pressure to unlock the locked trailer tires.

The control system may also be further configured to evaluate actuation of the one or more mechanisms, determine a reaction of a trailer section of the vehicle, and adjust the actuation of the one or more mechanisms in response to the determined reaction.

According to another aspect of the technology, a method is provided for controlling an articulated vehicle that configured to operate in an autonomous driving mode. The vehicle includes a driving system having a steering subsystem, an acceleration subsystem and a deceleration subsystem to control driving of the vehicle in the autonomous driving mode. The method comprises receiving, by a control system of the vehicle, sensor data from a perception system of the vehicle, the sensor data being associated with information regarding different parts of the vehicle; determining, by the control system, a current behavior of the vehicle based on the received sensor data, the current behavior indicating an orientational relationship between the different parts of the vehicle; determining, by the control system, an expected behavior of the vehicle based on at least on a model of the vehicle and a planned route; comparing, by the control system, the expected behavior to the current behavior to identify whether there is a match; upon a determining that there is no match between the expected behavior and the current behavior, determining whether there is an actual or expected jackknifing situation; determining, by the control system, a type of the jackknifing situation; based on the type of the jackknifing situation, selecting one or more mechanisms of the deceleration system to cause vehicle braking; and actuating the one or more mechanisms to cause the vehicle braking.

In one example, determining the type of jackknifing situation comprises determining either a tractor jackknifing situation or a trailer jackknifing situation. In another example, determining the expected behavior of the vehicle is further based on at least one of map information, weather information, one or more driving commands, or a desired vehicle state. In a further example, the orientational relationship between the different parts of the vehicle includes orientation information about current states of different sections of the vehicle according to one or more of position, roll, pitch, yaw, or time derivatives thereof.

The one or more mechanisms may be selected for modulation of service pressure delivered to a trailer brake system of the deceleration subsystem independently of tractor brake pressure. In this case, the one or more mechanisms may comprise a pair of mechanisms, and modulation of the service pressure may include sequentially activating the pair of mechanisms to cause the vehicle braking.

BRIEF DESCRIPTION OF THE DRAWINGS

FIGS. 1A-B illustrate an example cargo-type vehicle configured for use with aspects of the technology.

FIGS. 5A and 5B illustrate two different jackknifing scenarios in accordance with aspects of the technology.

FIG. 10 illustrates an example process in accordance with aspects of the technology.

DETAILED DESCRIPTION

Figure 1C:
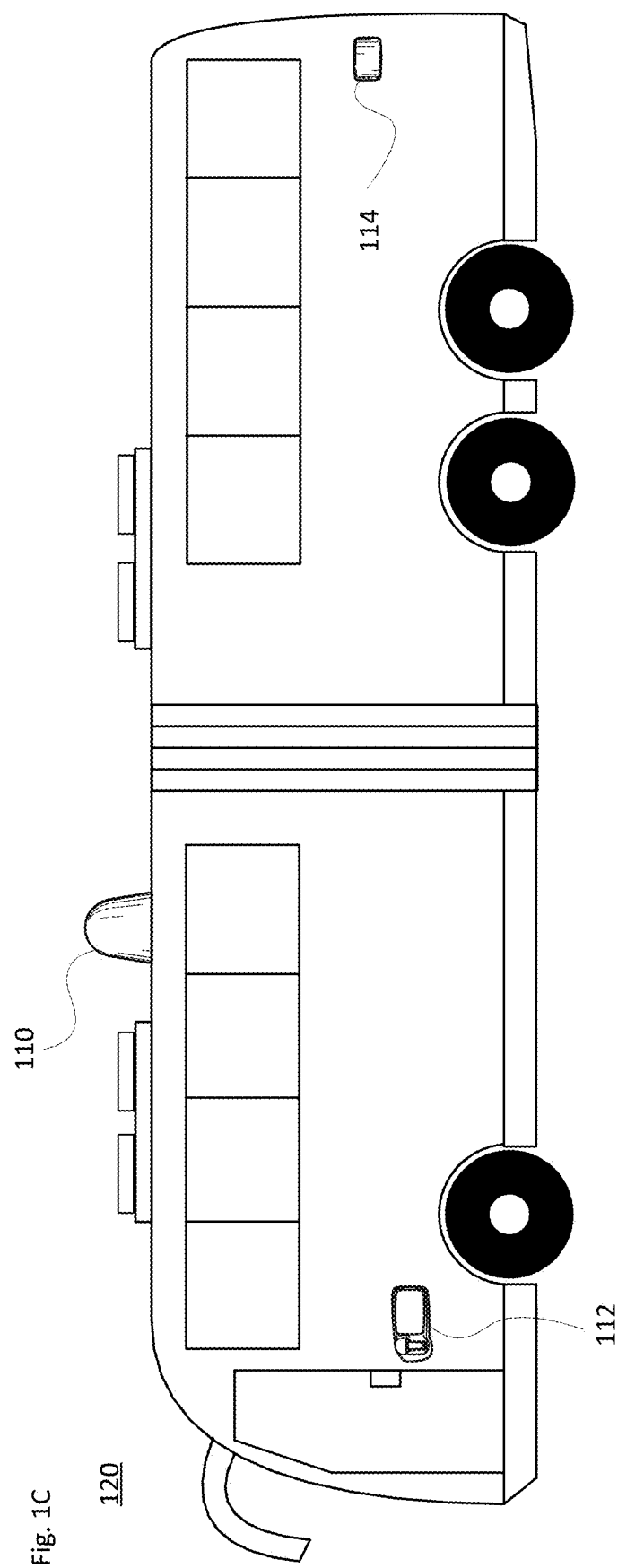
FIGS. 1C-D illustrate an example articulated bus arrangement for use with aspects of the technology.

Features of the technology involve controlling an articulated self-driving vehicle by detecting a jackknifing situation and taking corrective action as needed. This can include comparing a planned trajectory and pose with an actual trajectory and pose of the vehicle in order to identify whether the tractor or the trailer is in danger of jackknifing (or actually jackknifing. The vehicle's on-board computer system can take real-time corrective action, such as modulating or otherwise performing a selective braking action with the vehicle's brakes.

Example Vehicle Systems

FIGS. 1A-B illustrate an example cargo vehicle 100, such as a tractor-trailer truck. FIG. 1A is a side view and FIG. 1B is a top-down view. The truck may include, e.g., a single, double or triple trailer, or may be another medium or heavy-duty truck such as in commercial weight classes 4 through 8. As shown, the truck includes a tractor unit 102 and a single cargo unit or trailer 104. The trailer 104 may be fully enclosed, open such as a flat bed, or partially open depending on the type of cargo to be transported. In this example, the tractor unit 102 includes the engine and steering systems (not shown) and a cab 106 for a driver and any passengers. In a fully autonomous arrangement, the cab 106 may not be equipped with seats or manual driving components, since no person may be necessary.

The trailer 104 includes a hitching point, known as a kingpin, 108. The kingpin 108 is typically formed as a solid steel shaft, which is configured to pivotally attach to the tractor unit 102. In particular, the kingpin 108 attaches to a trailer coupling 110, known as a fifth-wheel, that is mounted rearward of the cab 106. For a double or triple tractor-trailer, the second and/or third trailers may have simple hitch-type articulation connections to the leading trailer. Or, alternatively, each trailer may have its own kingpin. In this case, at least the first and second trailers could include a fifth-wheel type structure arranged to couple to the next trailer.

Figure 1D:
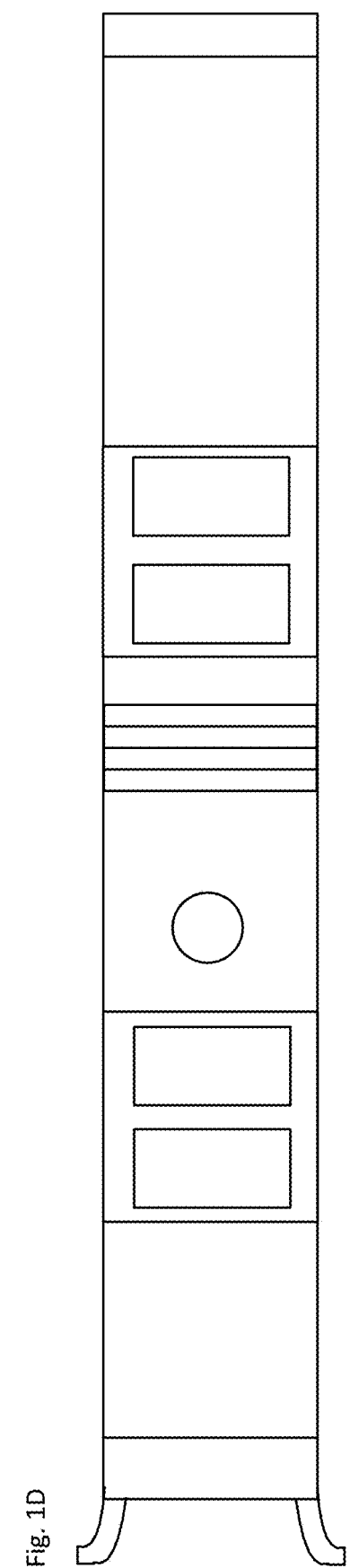

As shown, the tractor and/or trailer may have one or more sensor units 112, 114 and 116 disposed therealong. For instance, one or more sensor units 112 may be disposed on a roof or top portion of the cab 106, and one or more side sensor units 114 may be disposed, e.g., on left and/or right sides of the cab 106. In some cases, such sensor units may be located on the top of, on the bottom of, adjacent to, or in place of rear-view mirrors. Sensor units may also be located along other regions of the cab 106, such as along the front bumper or hood area, in the rear of the cab adjacent to the fifth-wheel, underneath the chassis, etc. The trailer 104 may also have one or more sensor units 116 disposed therealong, for instance along a side panel, front, rear, roof and/or undercarriage of the trailer 104. FIGS. 1C-D illustrate an example of another type of articulated vehicle 120, such as an articulated bus. As with the tractor-trailer 100, the articulated bus 120 may include one or more sensor units disposed along different areas of the vehicle.

By way of example, each sensor unit may include one or more sensors, such as lidar, radar, camera (e.g., optical or infrared), acoustical (e.g., microphone or sonar-type sensor), pressure (e.g., piezoelectric or mechanical), inertial (e.g., accelerometer, gyroscope, etc.) or other sensors (e.g., positioning sensors such as GPS sensors). Acoustical sensors near the tires (e.g., on the vehicle chassis near the axles or wheel wells) can detect the sounds of the tires as the vehicle drives autonomously along the roadway. A change in sound may indicate a different road surface type, a flat or under-pressurized tire or other circumstance. Pressure sensors could be used to detect instantaneous tire pressure or the weight distribution of cargo. While certain aspects of the disclosure may be particularly useful in connection with specific types of vehicles, the vehicle may be any articulating type of vehicle including, but not limited to, trucks and other cargo vehicles, buses, construction equipment, fire trucks, SUVs or other vehicles towing a camper, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi- or fully autonomous modes, e.g., Levels 1-5, which are referred to herein as autonomous driving modes. Thus, reference to an autonomous driving mode can include both partial and full autonomy.

Figure 2A:
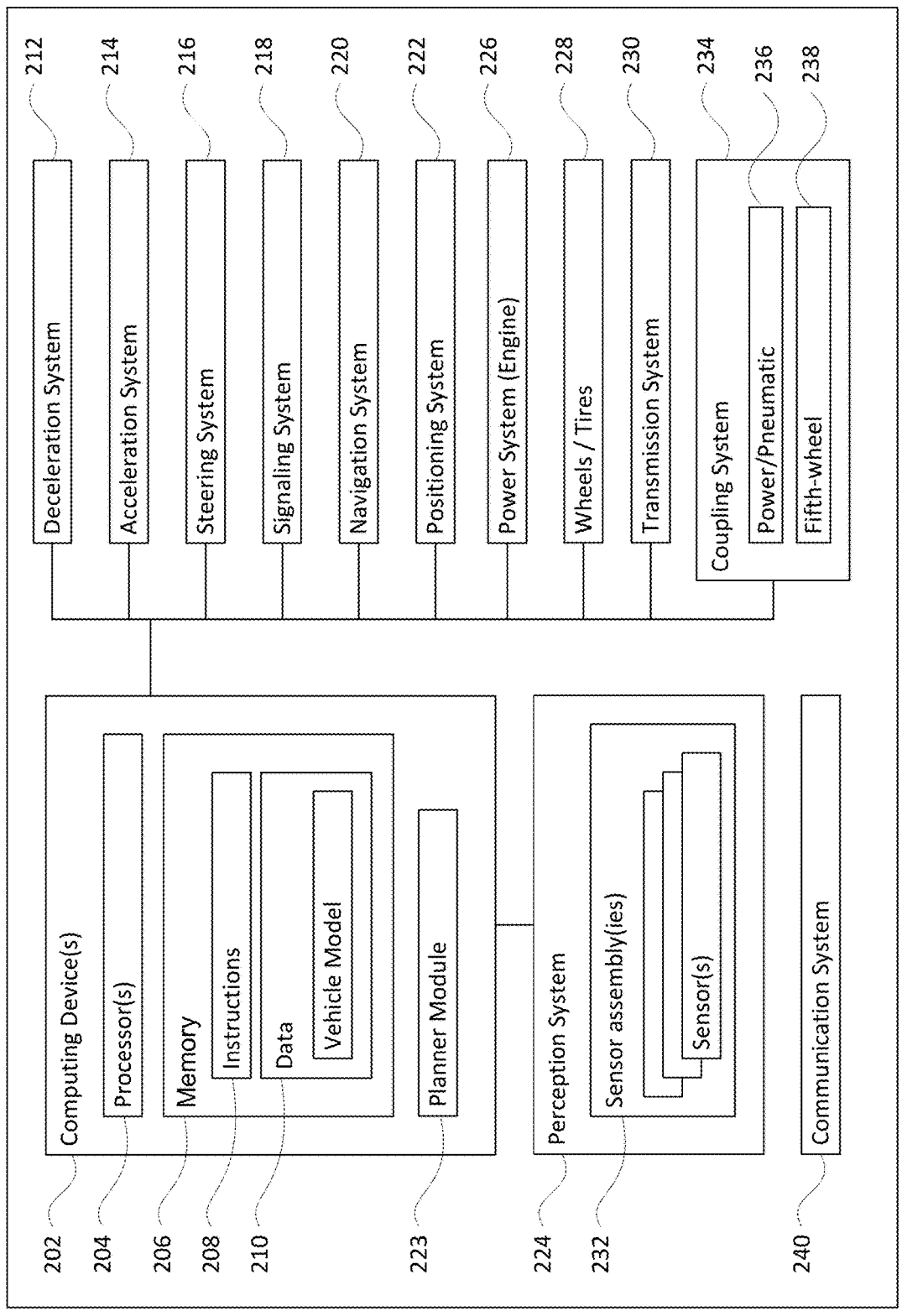
FIGS. 2A-B are block diagrams of systems of an example articulated vehicle in accordance with aspects of the technology.

FIG. 2A illustrates a block diagram 200 with various components and systems of an exemplary vehicle, such as cargo vehicle 100 or bus 120, to operate in an autonomous driving mode. As shown, the block diagram 200 includes a control system having one or more computing devices 202. The control system may constitute an electronic control unit (ECU) of a tractor unit of the cargo vehicle 100. The computing devices 202 contain one or more processors 204, memory 206 and other components typically present in general purpose computing devices. The memory 206 stores information accessible by the one or more processors 204, including instructions 208 and data 210 that may be executed or otherwise used by the processor(s) 204. For instance, the data 210 may include a model of the vehicle, such as a kinematic model for both the tractor and trailer(s), or for different parts of the articulating vehicle. The computing system can control overall operation of the vehicle when operating in an autonomous driving mode according to the vehicle model.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics, detected sensor data, actual and/or planned route data, etc.

The processors 204 may be commercially available CPUs. Alternatively, each processor may be a dedicated device such as an ASIC or other hardware-based processor. Although FIG. 2A functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, the computing devices 202 may be in communication with various systems of the vehicle, such as a driving system including a deceleration system 212 (for controlling braking of the vehicle), acceleration system 214 (for controlling acceleration of the vehicle), steering system 216 (for controlling the orientation of the wheels or wheel sets and the direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination, for selecting an intermediate section of the route, or for making modifications to various driving aspects in view of current or expected conditions or situations along the route in view of the maneuvering capabilities of the vehicle.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 may be coupled to the deceleration system 212, acceleration system 214, steering system 216 and/or transmission system 230. By way of example, each wheel or wheel set may be separately controllable for braking. The computing devices 202 may be able to receive information about tire pressure, balance and other factors that may impact driving or braking in an autonomous mode.

The computing devices 202 may control the direction and speed of the vehicle, e.g., via the planner module 223, by controlling various components. By way of example, computing devices 202 may navigate the vehicle to a destination location completely autonomously using data from map information and the navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the individual wheels or wheel sets of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps (e.g., digital roadgraphs) that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes one or more sensor assemblies 232 for detecting objects external to the vehicle. The detected objects may be other vehicles, obstacles in the roadway, traffic signals, signs, trees, etc. By way of example only, the sensor assemblies 232 of the perception system 224 may each include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. In addition, the sensors may detect road conditions, like standing water, ice, or potholes, as well as the positions and orientations (pose) of different parts of the vehicle.

The perception system 224 may also include other sensors within the vehicle to detect objects and conditions within the vehicle, such as in the trailer or passenger compartment. For instance, such sensors may detect, e.g., cargo, passengers, etc., as well as conditions within the vehicle or a component thereof, and/or outside the vehicle such as temperature, humidity, etc. Still further, sensors of the perception system 224 may measure the rate of rotation of the wheels 228, an amount or a type of braking by the deceleration system 212, pressure, alignment and other factors associated with the equipment of the vehicle itself. Depending on the vehicle configuration, the longitudinal position of the kingpin of the tractor may be adjustable. One or more sensors may be arranged to detect the specific longitudinal position of the kingpin, as well as the relative orientation of the tractor (or trailer) with respect to the trailer (or tractor).

The raw data from the sensors and the aforementioned characteristics can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223. In addition, the computing devices 202 may perform calibration of individual sensors, all sensors in a particular sensor assembly, or between sensors in different sensor assemblies or other physical housings.

As noted above, one or more sensors of the perception system 224 may be incorporated into sensor assemblies or housings. In one example, these may be integrated into the side-view mirrors on the vehicle, e.g., as sensor towers integrated into the side-view mirrors on the truck, farm equipment, construction equipment or the like. In another example, other sensors may be part of the roof-top housing 112, or other sensor housings or units 114 and/or 116. The computing devices 202 may communicate with the sensor assemblies located on or otherwise distributed along the vehicle. Sensor assemblies 232 may also be positioned at different locations on the tractor unit 102 or on the trailer 104, as noted above with regard to FIGS. 1A-B, or at different positions along the articulated bus of FIGS. 1C-D. The computing devices 202 may communicate with the sensor assemblies located on both the tractor unit 102 and the trailer 104. Each assembly may have one or more types of sensors such as those described above.

Also shown in FIG. 2A is a coupling system 234 for connectivity between the tractor unit and the trailer. The coupling system 234 may include one or more power and/or pneumatic connections 236 and a fifth-wheel 238 at the tractor unit for connection to the kingpin of the trailer. In other types of articulating vehicles, the fifth-wheel and kingpin may be replaced by another type of pivoting connection (e.g., a towing hitch).

A communication system 240 is also shown as part of vehicle system 200. For instance, the communication system 240 may also include one or more wireless configurations to facilitate communication with other computing devices, such as passenger computing devices within the vehicle, computing devices external to the vehicle such as in another nearby vehicle on the roadway, and/or a remote server system. Such connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 2B:
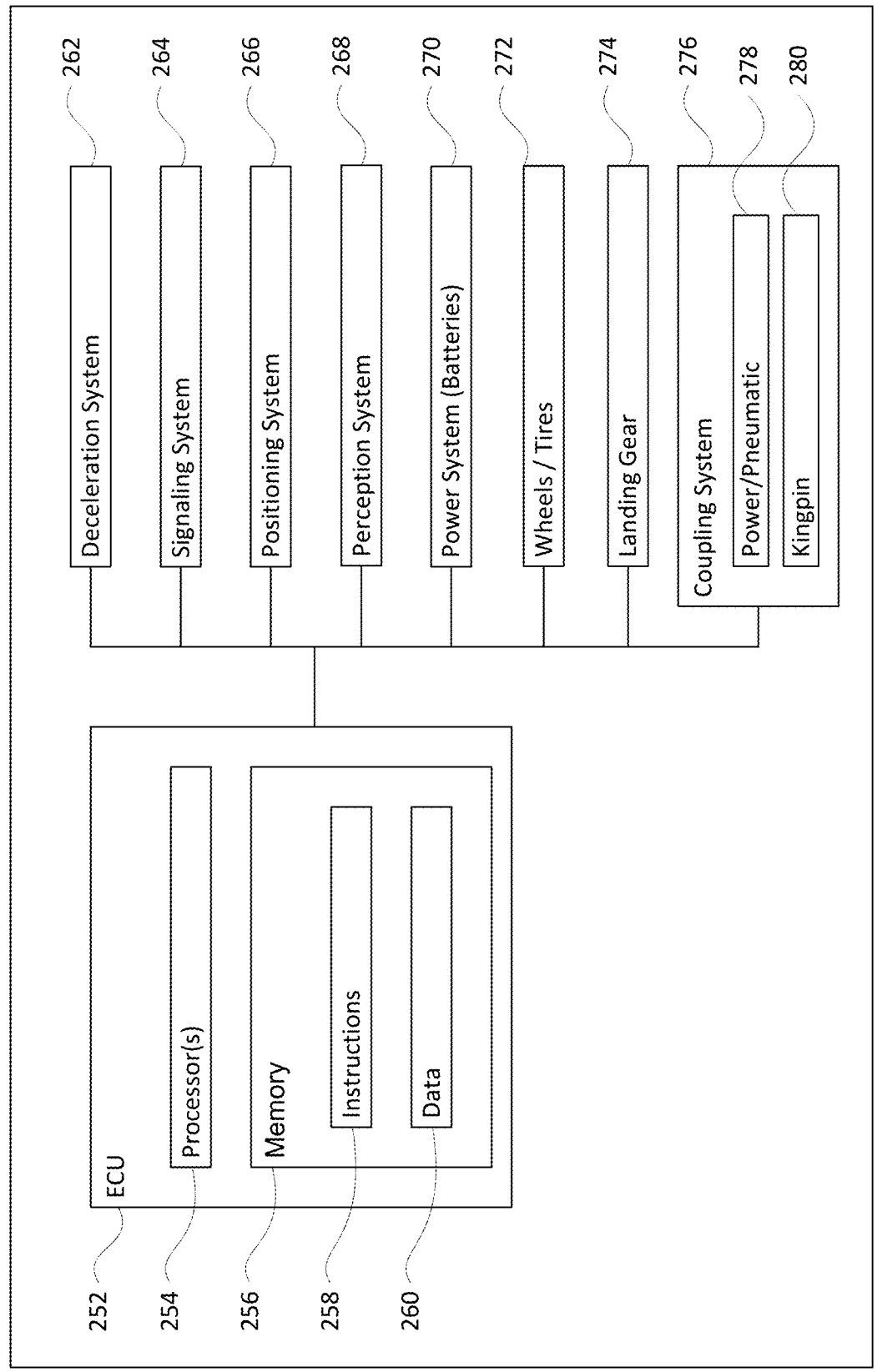

FIG. 2B illustrates an example block diagram 250 of trailer-based subsystems, such as might be included in trailer 104 of FIGS. 1A-B. As shown, the system includes an ECU 252 of one or more computing devices, such as computing devices containing one or more processors 254, memory 256 and other components typically present in general purpose computing devices. The memory 256 stores information accessible by the one or more processors 254, including instructions 258 and data 260 that may be executed or otherwise used by the processor(s) 254. The descriptions of the processors, memory, instructions and data from FIG. 2A apply to these elements of FIG. 2B.

In one scenario, the ECU 252 is configured to receive information and control signals from the trailer unit. The on-board processors 254 of the ECU 252 may communicate with various systems of the trailer, including deceleration system 262, signaling system 264, and a positioning system 266. The ECU 252 may also be operatively coupled to a perception system 268 with one or more sensors for detecting objects in the trailer's environment, and a power system 270 (for example, a battery power supply) to provide power to local components. Some or all of the wheels/tires 272 of the trailer may be independently coupled to the deceleration system 262. The processors 254 may be able to receive information about tire pressure, balance, temperature, wheel speed and other factors that may impact driving or braking in an autonomous mode, and to relay that information to the processing system of the tractor unit. The deceleration system 262, signaling system 264, positioning system 266, perception system 268, power system 270 and wheels/tires 272 may operate in a manner such as described above with regard to the subsystems of FIG. 2A.

In this example, the trailer also includes a set of landing gear 274 as well as a coupling system 276. The landing gear provide a support structure for the trailer when decoupled from the tractor unit. The coupling system 276, which may be a part of coupling system 234, provides connectivity between the trailer and the tractor unit. Thus, the coupling system 276 may include a connection section 278 (e.g., for power, communication and/or pneumatic links). As shown, the coupling system 276 also includes a kingpin 280 configured for connectivity with the fifth-wheel of the tractor unit. While the components and systems of FIGS. 2A-B are described in relation to a tractor-trailer arrangement, as noted above the technology may be employed with other types of articulated vehicles, such as the articulate bus 120 of FIGS. 1C-D.

Communication between the different parts of the vehicle, e.g., between a tractor unit and a trailer, can be done wirelessly or via a wired connection. In the latter case, the system may employ a protocol using the Controller Area Network (CAN) bus architecture, or an Ethernet-based technology such as BroadR-Reach®, may be employed between ECUs on the tractor unit and the trailer. Alternatively, other signaling approaches may also be used or not used at all. For instance, in vehicle arrangements where there is no direct communication between the trailer and tractor, braking-related decisions according to aspects of the technology may be performed by the trailer ECU. This can be done, for instance, based on a pneumatic control signal that sets the brake pressure.

Example Implementations

In view of the structures and configurations described above and illustrated in the figures, various aspects will now be described in accordance with aspects of the technology.

As noted above, various sensors may be located at different places around the vehicle (see FIGS. 1A-B) to gather data from different parts of the external environment and/or the vehicle itself. Certain sensors may have different fields of view (FOV) of the external environment and/or parts of the vehicle depending on their placement around the vehicle and the type of information they are designed to gather. For instance, different lidar sensors may be used for near (short range) detection of objects adjacent to the vehicle (e.g., less than 2-10 meters), while others may be used for far (long range) detection of objects a hundred meters (or more or less) in front of the vehicle. Mid-range lidars may also be employed. Multiple radar units may be positioned toward the front or rear of the vehicle for long-range object detection. And cameras may be arranged to provide good visibility around the vehicle. Depending on the configuration, certain types of sensors may include multiple individual sensors with overlapping fields of view. Alternatively or additionally, other sensors may provide redundant 360° fields of view. In addition to detecting objects in the environment external to the vehicle, these sensors may be used to determine the vehicle's actual pose including, e.g., the orientation of the trailer with respect to the tractor unit of a cargo vehicle, or the respective orientations of the front and rear of an articulated bus. This can include orientation information about the state of different sections of the vehicle (e.g., tractor or trailer) in terms of position, roll, pitch, yaw, and associated time derivatives of such state information.

Figure 3:
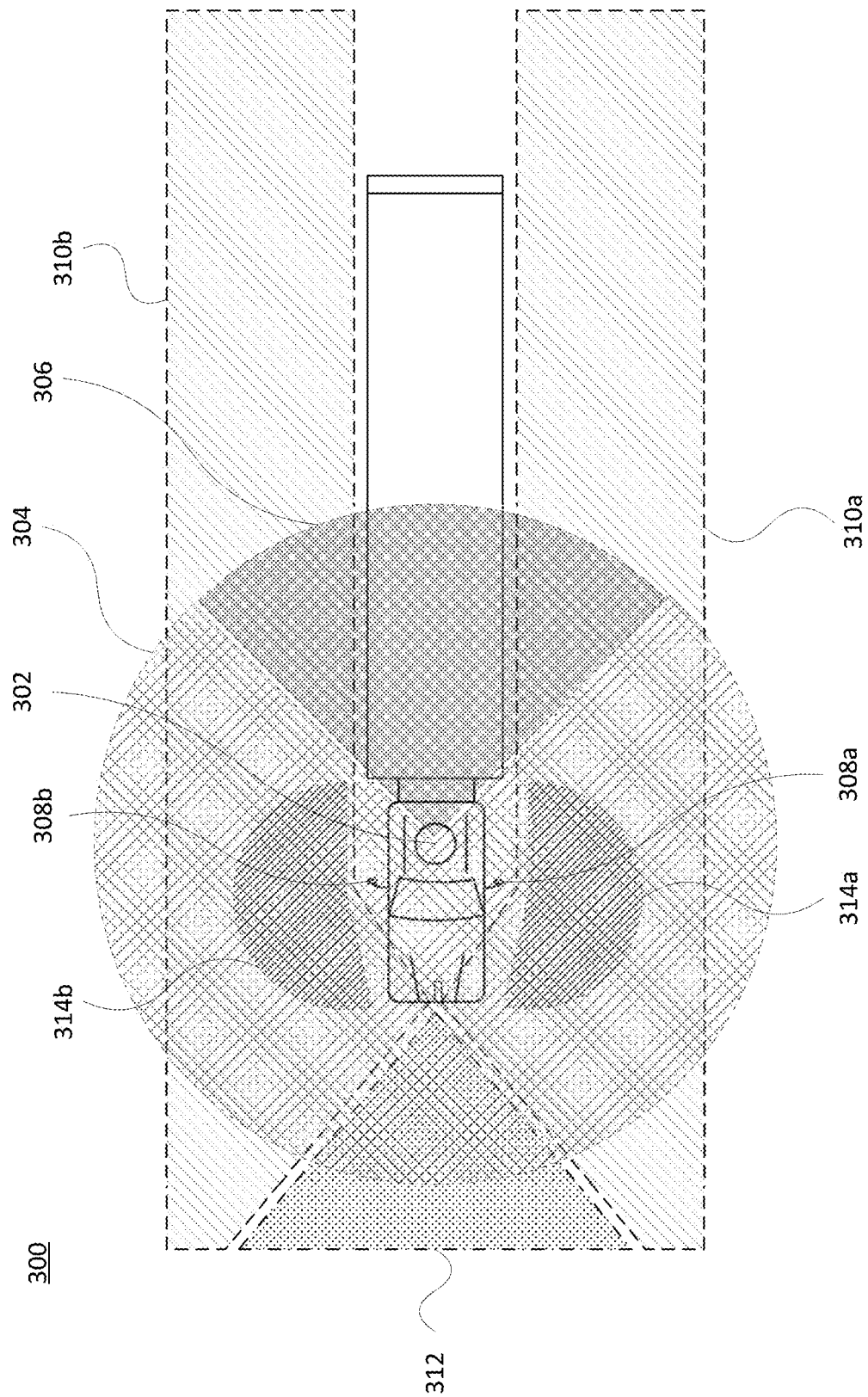
FIG. 3 illustrates example sensor fields of view for a cargo-type vehicle in accordance with aspects of the disclosure.

FIG. 3 provides one example 300 of sensor fields of view relating to the sensors, such as those illustrated in FIG. 1B. As illustrated in example 300 of FIG. 3, the lidar(s) in the rooftop sensor housing 302 may have a FOV 304. Here, as shown by region 306, the trailer or other articulating portion of the vehicle may provide signal returns, and may partially or fully block a rearward view of the external environment. Long range lidars of left and right side sensor units 308a, 308b of the tractor unit have FOVs 310a and 310b. These can encompass significant areas along the sides and front of the vehicle. As shown, there may be an overlap region 312 of their fields of view in front of the vehicle. The overlap region 312 provides the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars of the sensor units 308a and 308b have smaller FOVs 314a and 314b. Both the long range and short range lidars may be co-located in a single housing 308a or 308b as shown, or may be disposed separately on the vehicle. A space is shown between different fields of view for clarity in the drawing; however, in actuality there may be no break in the coverage. The specific placements of the sensor assemblies and fields of view is merely exemplary, and may be different depending on, e.g., the type of vehicle, the size of the vehicle, FOV requirements, etc.

Figure 4A:
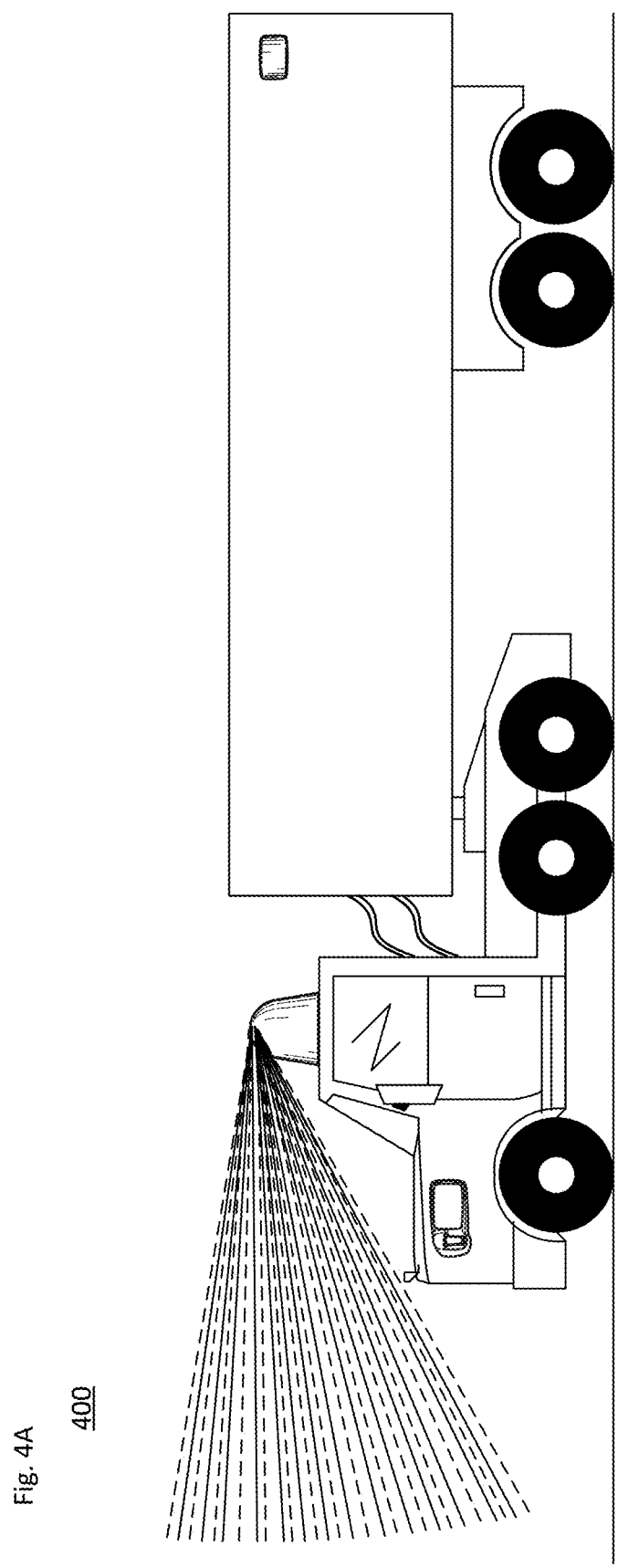
FIGS. 4A-B illustrate example sensor scan operations in accordance with aspects of the technology.
Figure 4B:
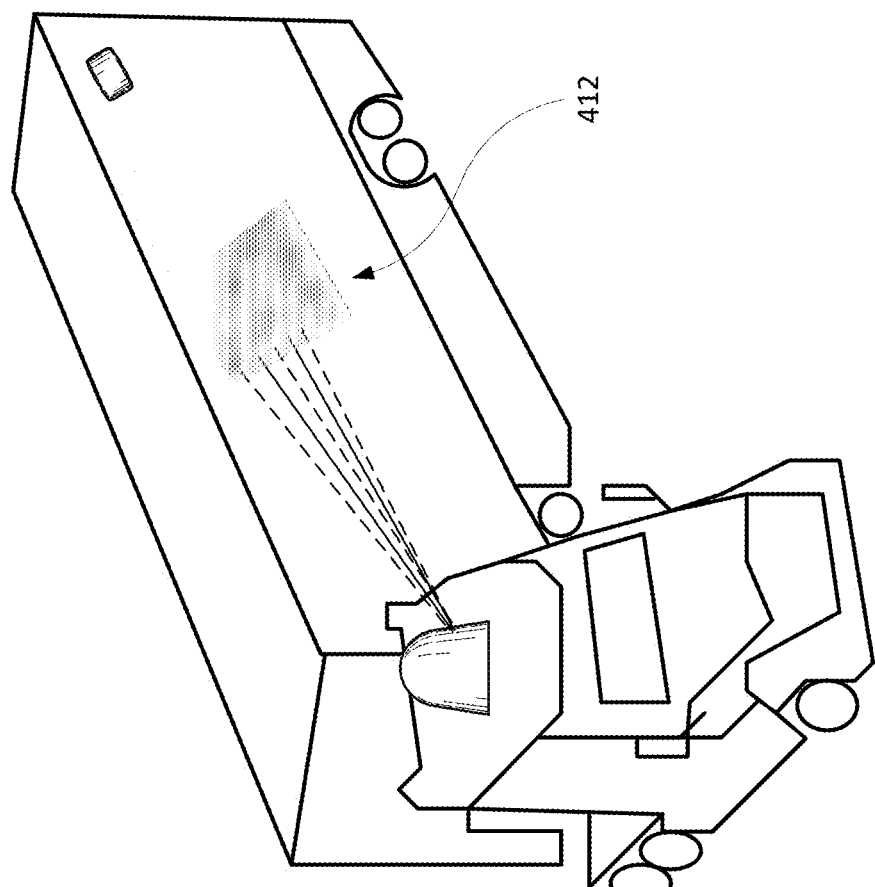

These and other sensors can detect not only the location of objects in the environment, but also their height and other information as well. This may be done by making multiple scans of the environment by one or more sensors. By way of example, illustration 400 of FIG. 4A shows a vehicle using a sensor assembly to scan for objects in the environment. The sensor assembly may be, e.g., rooftop sensor housing 302 of FIG. 3. The sensor assembly may include one or more lidar, radar, camera or other sensors therein. Solid and dashed lines emanating from the housing indicate examples of individual scans of the environment. For instance, 10 (or more or less) individual scans may be made by a given sensor per scan period. This may include adjusting the sensor's FOV up or down, left or right, e.g., with a motor, servo or other actuator. The individual scans may be selected to cover particular portions of the sensor's FOV or selected regions around the vehicle. Illustration 410 of FIG. 4B shows that some of the scans (via the solid and dashed lines) may generate a return signal (or signals) 412 from the trailer of the vehicle. Similarly, while not shown, a sensor along the trailer, such as sensor 116 of FIG. 1A, may generate a return signal from the tractor of the vehicle.

Example Scenarios

As noted above, aspects of the technology involve using actual and planned trajectory information to evaluate a likelihood of jackknifing, and performing automated braking to take the necessary corrective action.

There are different types of jackknifing situations, which may happen when different parts of the vehicle move in relation to one another.

One situation where jackknifing is a concern is when a tractor-trailer slowly backs up to a warehouse or other destination (a parking scenario). Here, the wheels of the tractor may be turned too much, causing a sharp angle between the tractor and the trailer. Because backing up happens at low speeds (e.g., 1-5 mph or less), there may be ample time to slow down further or stop entirely, and make corrective adjustments such as pulling forward and then backing up again. However, other situations when the vehicle is traveling along a roadway (driving scenarios) may significantly reduce the amount of time available to take corrective action. Immediate adjustments at roadway speeds (e.g., 25 mph for surface streets, or 55-70 mph for freeways), may be necessary to prevent a lane departure or irrevocable loss of control, which is important not only to the autonomous vehicle but also to other road users.

FIGS. 5A and 5B illustrate two different jackknifing scenarios. In particular, FIG. 5A illustrates a tractor jackknife scenario 500, and FIG. 5B illustrates a trailer jackknifing scenario 510.

As shown in FIG. 5A, in a tractor-trailer vehicle combination, jackknifing can occur due to application of the brakes where the axles of the tractor (or other lead articulating portion of the vehicle) lock and slide, but the trailer axles do not. Arrow 502 indicates the rotation or other movement of the tractor relative to the trailer, while dashed arrow 504 indicates the planned path of the vehicle. If the axle locking event is not mitigated, this leads to a "tractor jackknife". This is a particularly extreme mode of vehicle instability. Once jackknifing has occurred, for a human driver there may be nearly zero ability to control the trajectory of the vehicle via normal use of steering, the throttle pedal, or the brake pedal, although the driver may be able to use the trailer hand valve (also known as the trolley valve or Johnson bar) to activate the brakes on the trailer in an attempt to straighten out the vehicle. Under low surface friction conditions, such as wet or icy roads, tractor jackknifing can an especially high risk. Conventional anti-lock braking and stability control systems only react after the event has occurred, and may have no explicit knowledge of the intended future trajectory or desired current state of the vehicle.

In contrast, as shown in the tractor-trailer vehicle combination of FIG. 5B, trailer jackknifing can occur due to application of the brakes where the axles of the trailer (or other following portion of the articulating vehicle) lock and slide, but the tractor axles do not. Here, if the axle locking event is not mitigated, this leads to "trailer swing", as shown by arrow 512, while dashed arrow 514 indicates the planned path of the vehicle. Conventional brake systems may apply the same brake pressure to all axles. Unfortunately, this may cause too high brake torques on trailer axles, relative to the available road friction, depending on current vehicle loading. This excessive brake torque causes the wheels to lock and slide. Similar to issues with tractor jackknifing, conventional trailer anti-lock braking systems only react after the event has occurred, and have no knowledge of the intended future trajectory or desired current state of the vehicle.

According to aspects of the technology, depending on whether the situation is tractor or trailer jackknifing, the onboard autonomous control system is able to modulate or otherwise independently control the trailer brake system (e.g., deceleration system 262 of FIG. 2B) using current trailer state information from the sensors (e.g., perception systems 224 and/or 268 of FIGS. 2A and 2B) and the intended trailer state (e.g., from the planner module 223 and/or navigation system 220 of FIG. 2A).

In different real-time driving situations, the control system determines whether jackknifing is occurring, is imminent, or is otherwise likely to occur. This can be done as follows. First, the control system receives sensor data from the perception system(s), which can include information from lidar, radar, cameras, accelerometers, gyroscopes and/or other onboard sensors such as a magnetic encoder system may be employed on the kingpin and fifth-wheel to provide information regarding the relative alignment between the tractor unit and the trailer. This information is evaluated, for instance comparing the pose of the trailer to the pose of the tractor for a tractor-trailer type articulated vehicle to determine the actual relative alignment. By way of example, the system may evaluate one or more of the poses of the tractor and the trailer (e.g., with respect to their relative angle to one another), a time rate of change of the relative angle of different vehicle sections, a relative roll angle between the tractor and the trailer, etc. This provides contextual information about how different parts of the vehicle are currently behaving while driving along the roadway. The result is an actual (current) behavior of the vehicle.

The control system also evaluates the expected vehicle operation based on the planned route and/or vehicle trajectory. This can include analyzing a current segment of the route based on map information, a model of the vehicle, driving commands, weather information, and desired vehicle state. Map information may include the road grade, road width, surface type, etc. Driving commands may include commands to any of the deceleration system (e.g., an amount of braking to reduce the vehicle's speed to a selected speed), acceleration system (e.g., to increase the vehicle's speed to a selected speed), steering system (e.g., to turn left or right by a determined amount to account for a curve in the roadway, exit or enter a freeway, change lanes, etc.), transmission system (e.g., to shift gears based on an incline or decline in the roadway) or other vehicle systems. The commands may be analyzed over a selected period of time, such as over the last 10-30 seconds, or more or less. The desired vehicle state can include, e.g., the planned speed and/or vehicle pose for the current road segment. The vehicle pose may include information regarding the state of the vehicle in terms of position, roll, pitch, yaw, and associated time derivatives.

By way of example, the vehicle model may be a kinematic or dynamic model of the tractor-trailer vehicle. A kinematic model is a geometric model, and can be used to predict or describe vehicle motion in a speed-invariant way. However, a dynamics model may be employed, for instance to consider factors that depend on speed (e.g., drag and slip). The vehicle model can be calibrated to account for real-world conditions and driving situations. The positional relationship of the tractor unit and the trailer to one another is part of the model. For enhanced accuracy, the vehicle model may be calibrated on a per-vehicle or a per-trailer basis. The vehicle model may be employed by a planning subsystem, such as planner module 223 of FIG. 2A, when selecting a driving route and otherwise controlling the vehicle in an autonomous driving mode. Here, for instance, the planner module may factor in the model along with road shape (e.g., straight or curved), incline or decline angle, surface type (e.g., asphalt, concrete or gravel), potholes, etc., to make predictions about the reaction of the vehicle or future state of the vehicle under said conditions. The vehicle model may also be employed by another part of the computing system, for instance when taking corrective action (e.g., emergency braking or lane shifting to avoid an obstacle).

The evaluation of the vehicle model and other factors (such as highly detailed maps, weather conditions, and high precision measurements of the pose of the vehicle) can be used to derive an expected behavior of the vehicle regarding how it should currently be behaving. It can also be used to derive an expected behavior for how the vehicle should behave in the near future along an upcoming section of the roadway, such as over the next 1-10 seconds, or more or less.

Figure 6A:
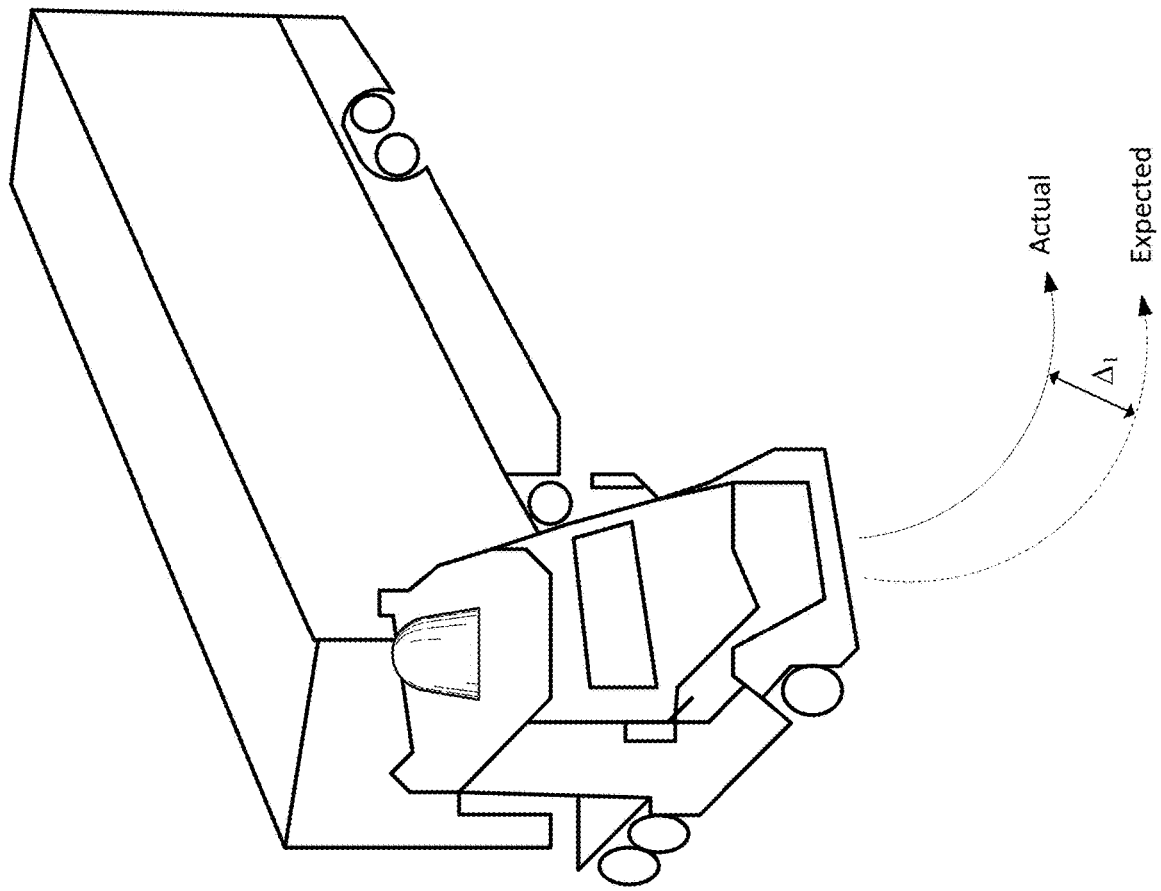
FIGS. 6A-B illustrate example tractor and trailer variances in accordance with aspects of the technology.
Figure 6B:
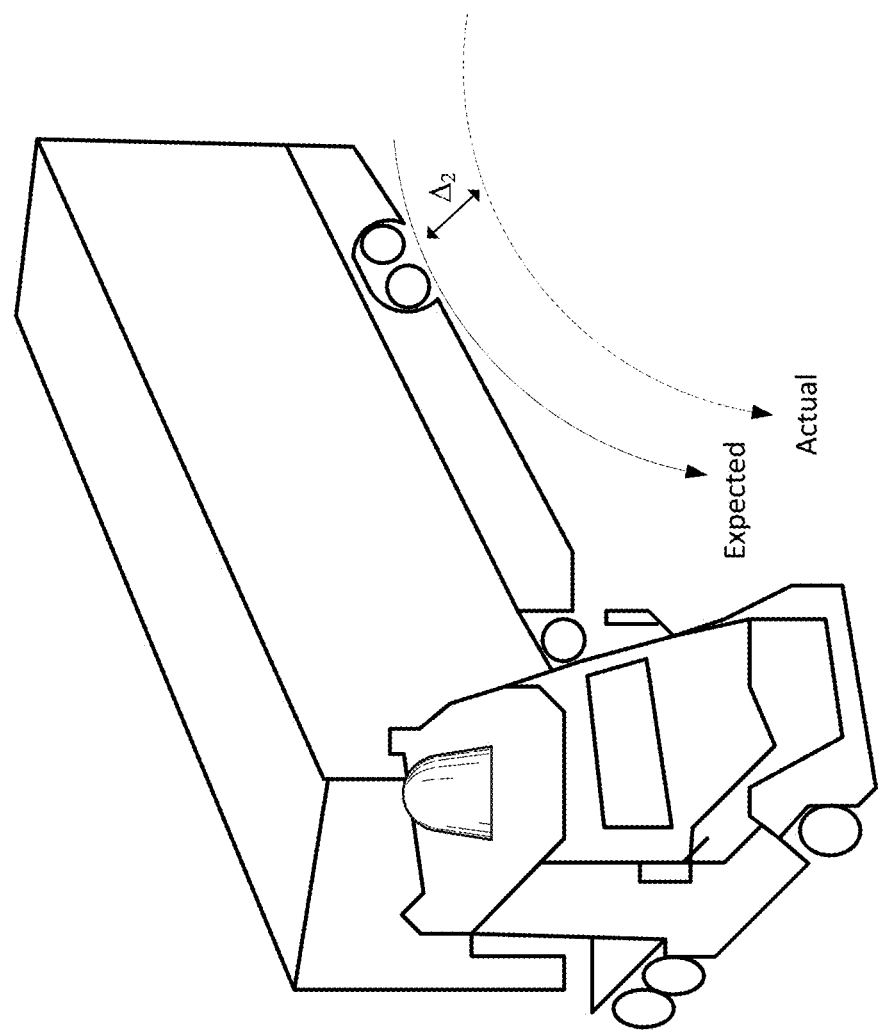

The actual and expected information is compared by the system (e.g., by computing device(s) 202 of FIG. 2A). If the expectation does not match the actual information, or deviates beyond some threshold amount, then the system may determine that the vehicle is currently in a jackknifing situation or may shortly encounter a jackknifing situation. In response to this, the on-board computer system may cause immediate corrective action to be taken. FIGS. 6A and 6B illustrate two examples of discrepancies between the actual and expected position information that may be due to jackknifing.

In example 600 of FIG. 6A, it can be seen that the expected position of the tractor (solid line) diverges from the actual position of the tractor (dashed line) by an amount $\Delta_1$. This deviation may be, e.g., on the order of 0.5 meters, at least 0.25 meters, no more than 2.5 meters, etc. In example 610 of FIG. 6B, it can be seen that the expected position of the trailer (solid line) diverges from the actual position of the trailer (dashed line) by an amount $\Delta_2$. This deviation may be, e.g., on the order of 0.5 meters, at least 0.25 meters, no more than 2.5 meters, etc.

These examples can apply to both what is currently happening during real-time driving, and what is predicted to occur during a next road segment (e.g., over the next 10-200 meters or during the next 1-10 seconds. For example, if the time rate of change of the relative angle between the tractor and trailer exceeds a threshold amount (e.g., 5°/second), then the onboard system may determine that the vehicle is currently in a tractor or trailer jackknifing situation. Or if the time rate of change of the relative angle is increasing over some timeframe (e.g., over 0.2-0.8 seconds), then the system may determine that the vehicle will encounter a jackknifing situation in the immediate future. In another example, the system may explicitly evaluate the relative angle between tractor and trailer. The relative angle (as opposed to angle rate) can be considered as an error at least somewhat uncoupled from path error. In any of these examples, an important aspect is evaluation of the delta (difference) between expectations and reality. For example, while driving in a straight line, holding the steering angle constant, one can expect the relative angle to remain fixed with the tractor and trailer in a straight line. Here, if the vehicle began braking and observed the trailer angle suddenly increasing quickly, this would violate assumptions about the expected relative poses, tractor to trailer. And as a result, such information could be used by the vehicle system(s) to control trailer and/or tractor braking.

Once the onboard system determines that the vehicle is either in a jackknife situation, or is predicted to encounter a jackknife situation, it can take corrective or precautionary action as needed, depending on what kind of jackknifing it is (tractor jackknife versus trailer jackknife). While such action can include a change to the steering direction and/or ceasing accelerating, according to one aspect of the technology the system is able to reduce or modulate the braking in the autonomous driving mode depending on the specific jackknifing scenario.

Figure 7:
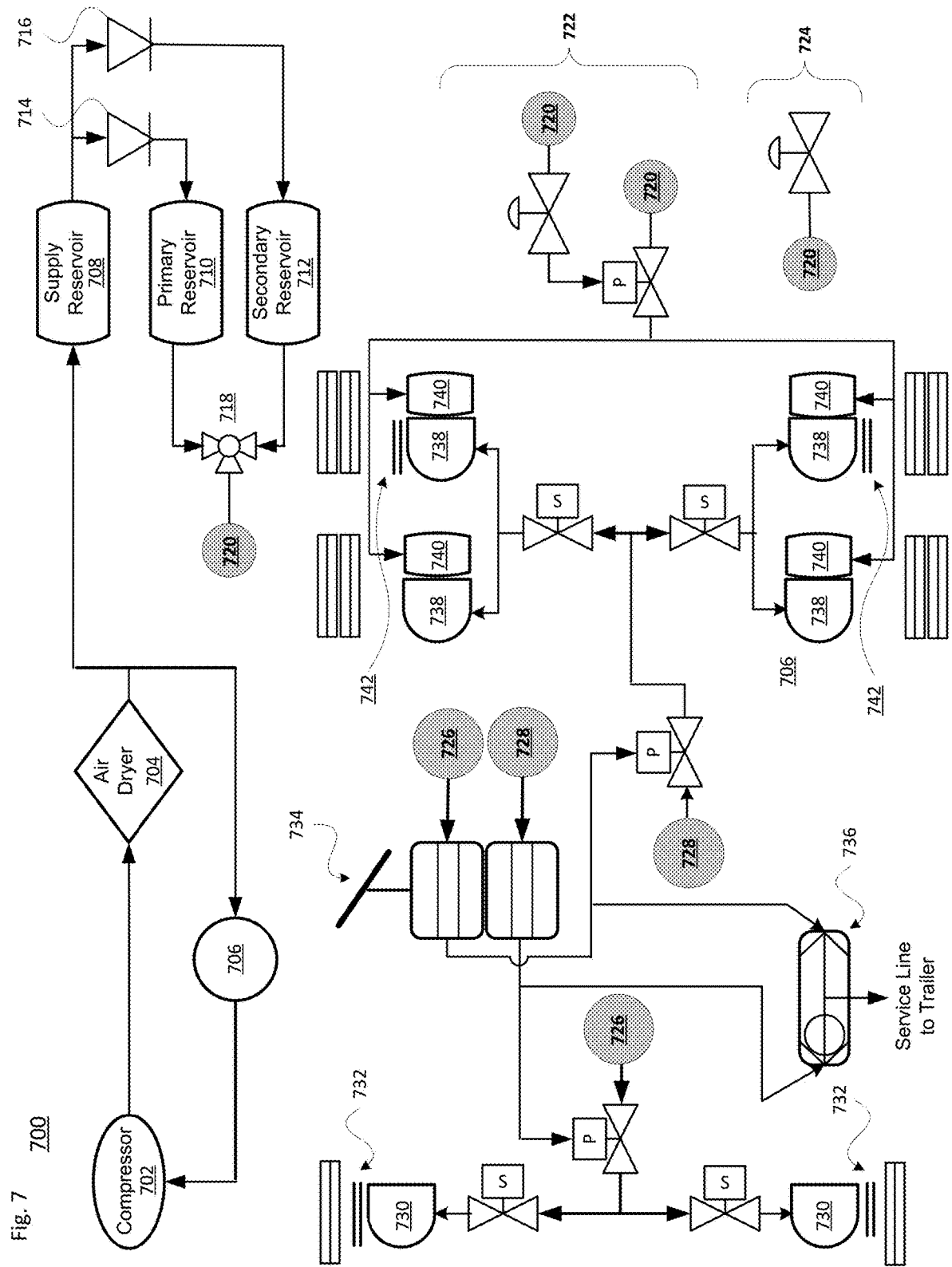
FIG. 7 illustrates a general braking system in accordance with aspects of the technology.

Before discussing specific braking operations, the braking system of an example articulated vehicle is presented in FIG. 7. This figure illustrates a portion of a pneumatic braking system 700 that may be used, e.g., with a class 8 tractor-trailer vehicle. Other types of articulated vehicles may have different pneumatic braking arrangements; however, the approaches described herein can be applied to such braking arrangements. The braking system 700 includes a compressor 702 coupled to an air dryer 704. The air dryer 704 outputs to both a compressor governor 706 and a supply reservoir 708. The supply reservoir 708 feeds a primary reservoir 710 and a secondary reservoir 712 via check valves 714 and 716, respectively.

Both the primary reservoir 710 and secondary reservoir 712 are coupled to a valve assembly 718, which feeds different parts of a parking and trailer circuit via node 720. This includes a dash hand valve (parking brake) unit 722 and a dash hand valve (trailer supply) unit 724. The primary and secondary reservoirs 710 and 712 also feed the brake system assemblies of the tractor and trailer via nodes 726 and 728, respectively (e.g., which may include two separate pipes). With respect to the tractor brake system, the secondary reservoir is used to actuate the brake chambers 730 via a set of valves. Here, wheel speed sensors 732 provide real-time information to the control system for the front tires. A footbrake or treadle valve 734 enables control of the air pressure that is delivered to the brake chambers for the trailer via a service line unit 736.

The brake chambers 738 for the trailer tires can be actuated via the pressure from the service line unit 736, while the parking brakes 740 can be actuated via the dash hand valve units. Here, wheel speed sensors 742 provide real-time information to the control system for the rear tires, e.g., via the trailer ECU. Pressure information from the valves of the tractor and trailer are also provided to the control system.

Figure 8:
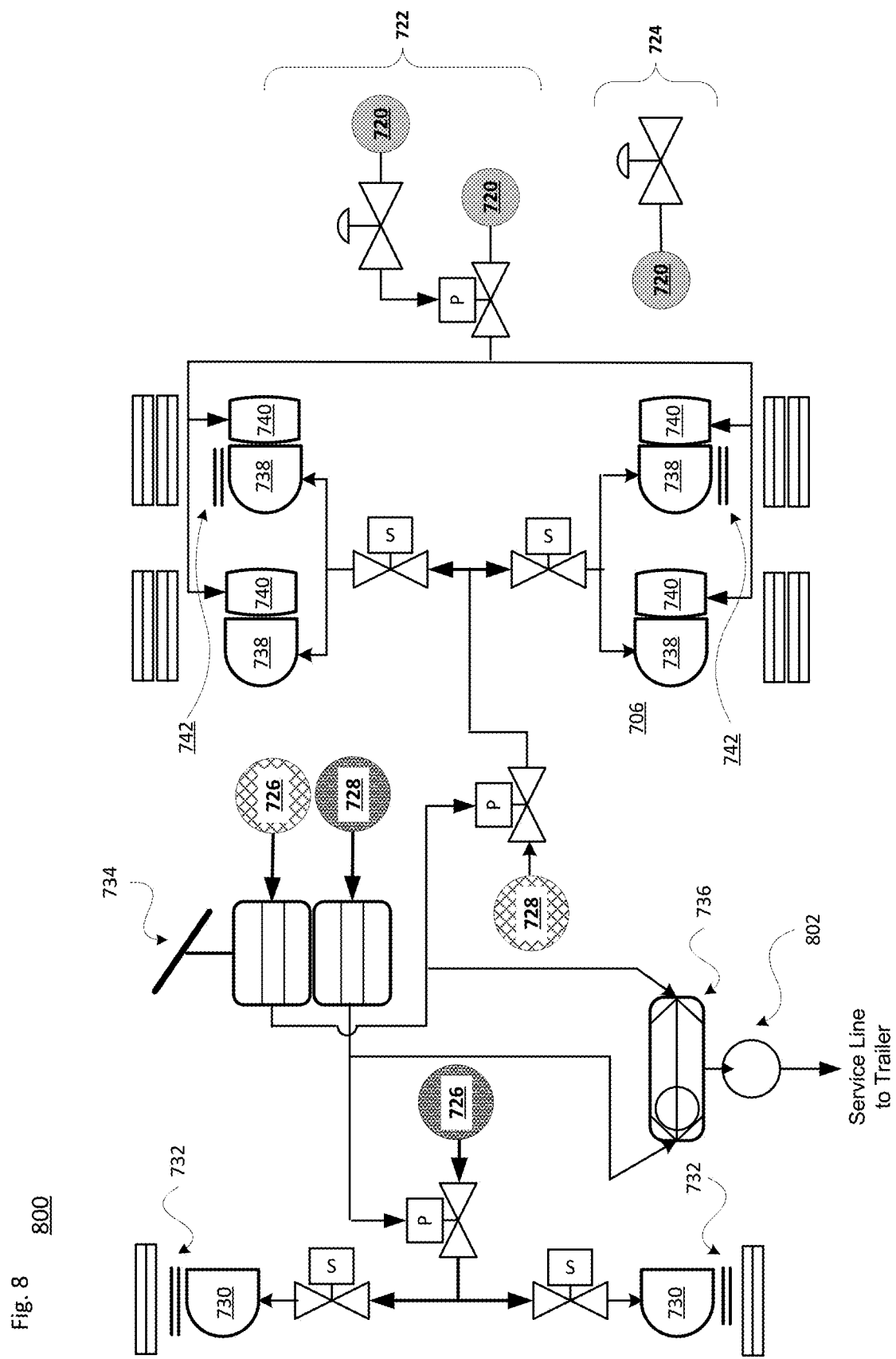
FIG. 8 illustrates a first braking arrangement for use in a tractor jackknifing scenario in accordance with aspects of the technology.

Turning now to FIG. 8, this figure illustrates a portion 800 of the pneumatic braking system 700, in which a mechanism 802 is configured to address tractor jackknifing by providing closed loop pressure control. As shown, the mechanism 802 is coupled to the service line to the trailer. Here, when tractor jackknifing is determined to be happening or is predicted to happen, the control system actuates the mechanism 802 via one or more commands, which controls the service pressure delivered to the trailer brake system independently of the tractor brake pressure.

The mechanism 802 includes at least two pneumatic input ports, which are connected to the trailer service line and the trailer supply. It also includes at least one pneumatic output port, which is connected to the trailer service line. The mechanism can measure pneumatic pressure on at least the output port(s). In one example, the system may be enhanced through additional pressure sensors measuring the pressure on the input port(s). Actuation of the mechanism 802 may be as follows. The mechanism contains a pressure regulating valve, such as a proportional valve or solenoid valve. The mechanism can receive electronic commands for the desired output pressure of the pressure regulating valve. The mechanism is able to regulate the output pressure though measurement of the current output pressure, comparison of the current output pressure to the desired pressure value, and then actuation of the pressure regulating valve as needed to achieve the desired pressure value. By adjusting the braking along one or more wheel sets of the trailer (e.g., per axle), the alignment of the tractor can be changed to reduce or eliminate the jackknifing, or prevent the vehicle from jackknifing. In one scenario, the desired pressure for the trailer brakes could be determined by explicitly considering the wheel speeds of the trailer tires, observing when they lock, then "dumping" pressure to unlock them. In this case, because the axle-wise brake pressure cannot be controlled, the pressure could be determined by applying the brakes and observing the reaction of the trailer. If the response of the trailer indicates a jackknife, then the brake pressure would be reduced from the current value to some lesser value or to zero (gauge pressure). Depending on the exact scenario the pressure reduction and pressure reduction rate would be determined. For instance, under scenarios where a jackknife has been detected (as opposed to predicted), the pressure reduction may happen quickly and to a lower brake pressure (e.g., within tens of milliseconds or more).

Figure 9:
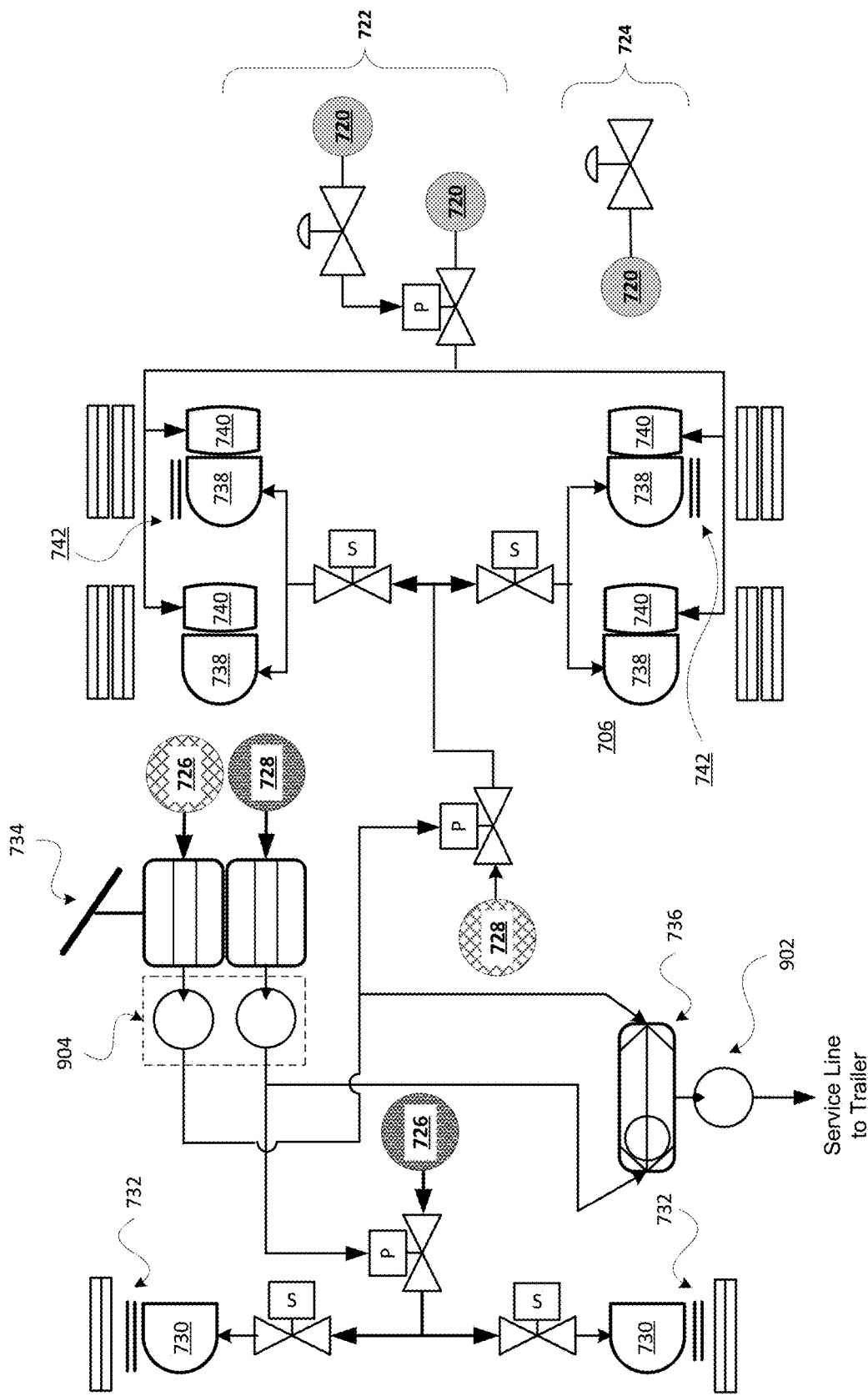
FIG. 9 illustrates a second braking arrangement for use in a trailer jackknifing scenario in accordance with aspects of the technology.

Turning next to FIG. 9, this figure illustrates a portion 900 of the pneumatic braking system 700, in which a pair of mechanisms 902 and 904 are configured to address trailer jackknifing by providing closed loop pressure control. The mechanism 902 is coupled to the service line to the trailer, and operates as described above with regard to the mechanism 802.

The mechanism 904 mechanism includes at least four pneumatic input ports, which are connected to the footbrake or treadle valve primary output, the footbrake or treadle valve secondary output, the primary reservoir and the secondary reservoir. This mechanism also includes at least two pneumatic output ports, which are connected to the primary and secondary brake circuits. By way of example, mechanism 904 could also cover both output ports of the brake pedal. Mechanism 904 is configured to measure pneumatic pressure on the two output ports.

Actuation of the mechanism 904 may be as follows. The mechanism contains a pressure regulating valve, such as a proportional valve or solenoid valve. The mechanism can receive electronic commands for the desired output pressure of the pressure regulating valve. The mechanism is able to regulate the output pressure though measurement of the current output pressure, comparison of the current output pressure to the desired pressure value, and then actuation of the pressure regulating valve as needed to achieve the desired pressure value. By adjusting the braking of the trailer, the alignment of the tractor can be changed to reduce or eliminate the jackknifing, or prevent the vehicle from jackknifing. In this case, the system would attempt to bring the tractor back to a state where it could control the vehicle combination (tractor+trailer). In other words, the system would attempt to align, the tractor, trailer, and path of travel, such that the typical controls again have control authority (including, e.g., steering system 216).

Here, when trailer jackknifing is determined to be happening or is predicted to happen, the control system actuates the mechanisms 902 and/or 904 via one or more commands, which modulates the service pressure delivered to the trailer brake system independently of the tractor brake pressure. The modulation can include any of (1) stopping brake pressure the trailer, (2) reduce the brake pressure to the trailer, or (3) use a specific signal shape for the pressure (e.g., sinusoidal wave, sawtooth wave to ramp pressure up and then down, etc.) In one scenario, the system may be aware of a higher risk of trailer jackknifing via the information discussed above. In this case, the system may choose to use mechanism 902 to preemptively alter the pressure wave going to the trailer. Here, mechanism 904 would operate as normal to actuate the tractor brakes. Conversely, if there were high risk of tractor jackknifing, the system may alter the timing of the brake application to the trailer. In this case the system could use mechanism 902 to first apply brake pressure on the trailer and then a short time later activate mechanism 904 to apply the tractor brakes (e.g., within tens of milliseconds, or more or less). In one example, the configuration of FIG. 9 may also be employed to handle tractor jackknifing via actuation of the mechanism 902 according to the approached described above for mechanism 802 of FIG. 8.

By way of example, FIG. 10 illustrates a general approach 1000 according to these different scenarios. At block 1002, the system determines whether there is an actual or expected jackknifing situation. For instance, as explained above, the actual vehicle information is compared to the expected vehicle information, and if there is a discrepancy (for either the current time or a future time) that exceeds a threshold, then the system determines that there is a jackknifing situation. If the threshold is not exceeded, then at block 1003 the vehicle continues with normal autonomous driving along the planned trajectory. At block 1004, which may occur concurrently with block 1002, the system evaluates the actual vehicle information, including the relative positions of the articulated portions of the vehicle (e.g., the tractor and the trailer) to determine if it is a tractor jackknifing situation or a trailer jackknifing situation. If it is a trailer jackknifing situation, then at block 1006 the control mechanism (e.g., mechanism 802 of FIG. 8 or mechanism 902 of FIG. 9) is actuated to control the service pressure delivered to the trailer brake system independently of the tractor brake pressure. This is done until the onboard control system determines that the tractor jackknifing has been resolved (or avoided in the expected jackknifing case). If it is a tractor jackknifing situation, then at block 1008 the control mechanisms (e.g., mechanisms 902 and 904 of FIG. 9) are actuated to modulate the service pressure delivered to the trailer brake system according to a selected modulation profile as described above, such as by using mechanism 902 to first apply brake pressure on the trailer and then a short time later sequentially activating mechanism 904 to apply the tractor brakes. This is done until the onboard control system determines that the trailer jackknifing has been resolved (or avoided in the expected jackknifing case).

Figure 11A:
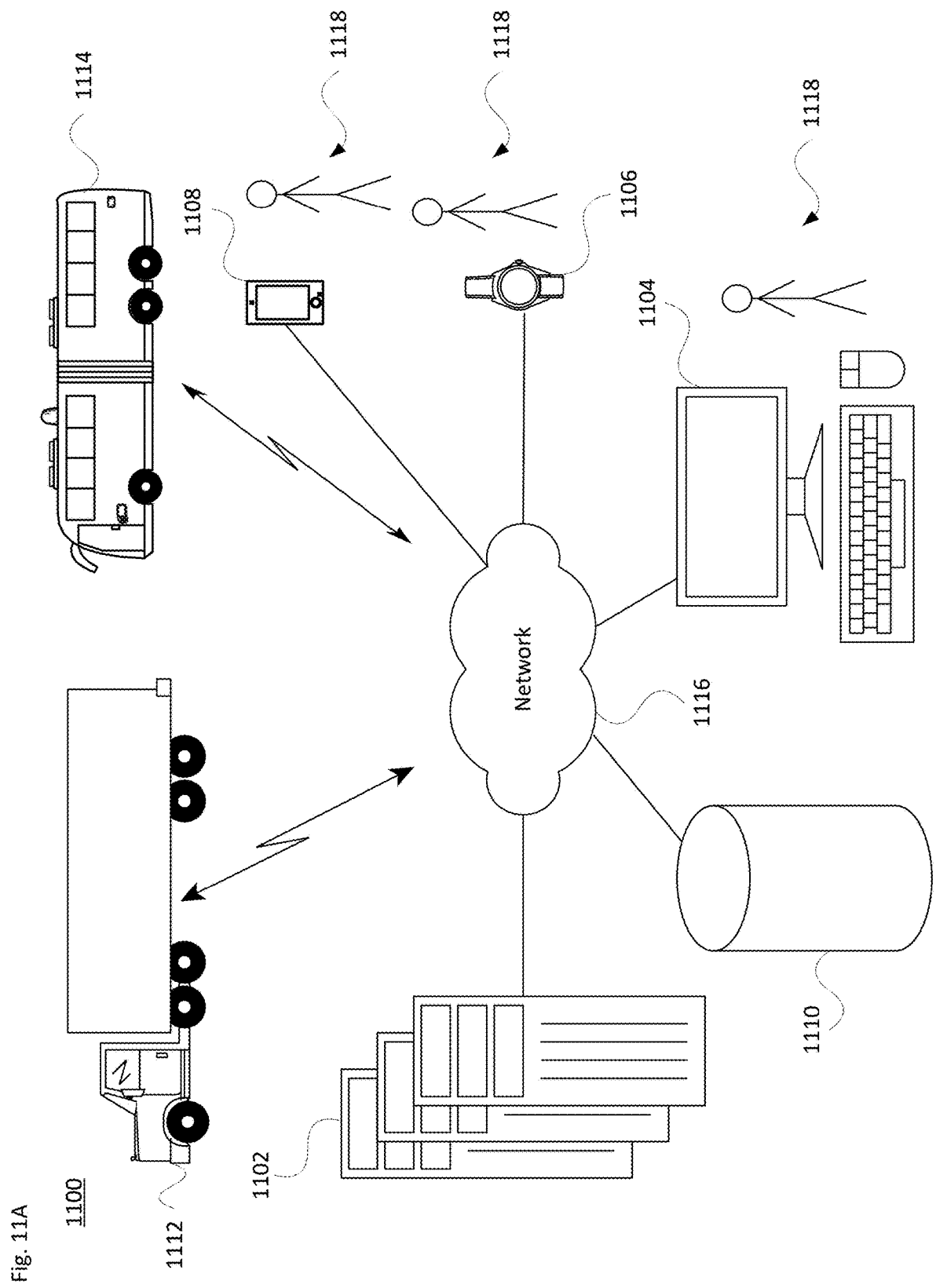
FIGS. 11A-B illustrate an example system in accordance with aspects of the technology.
Figure 11B:
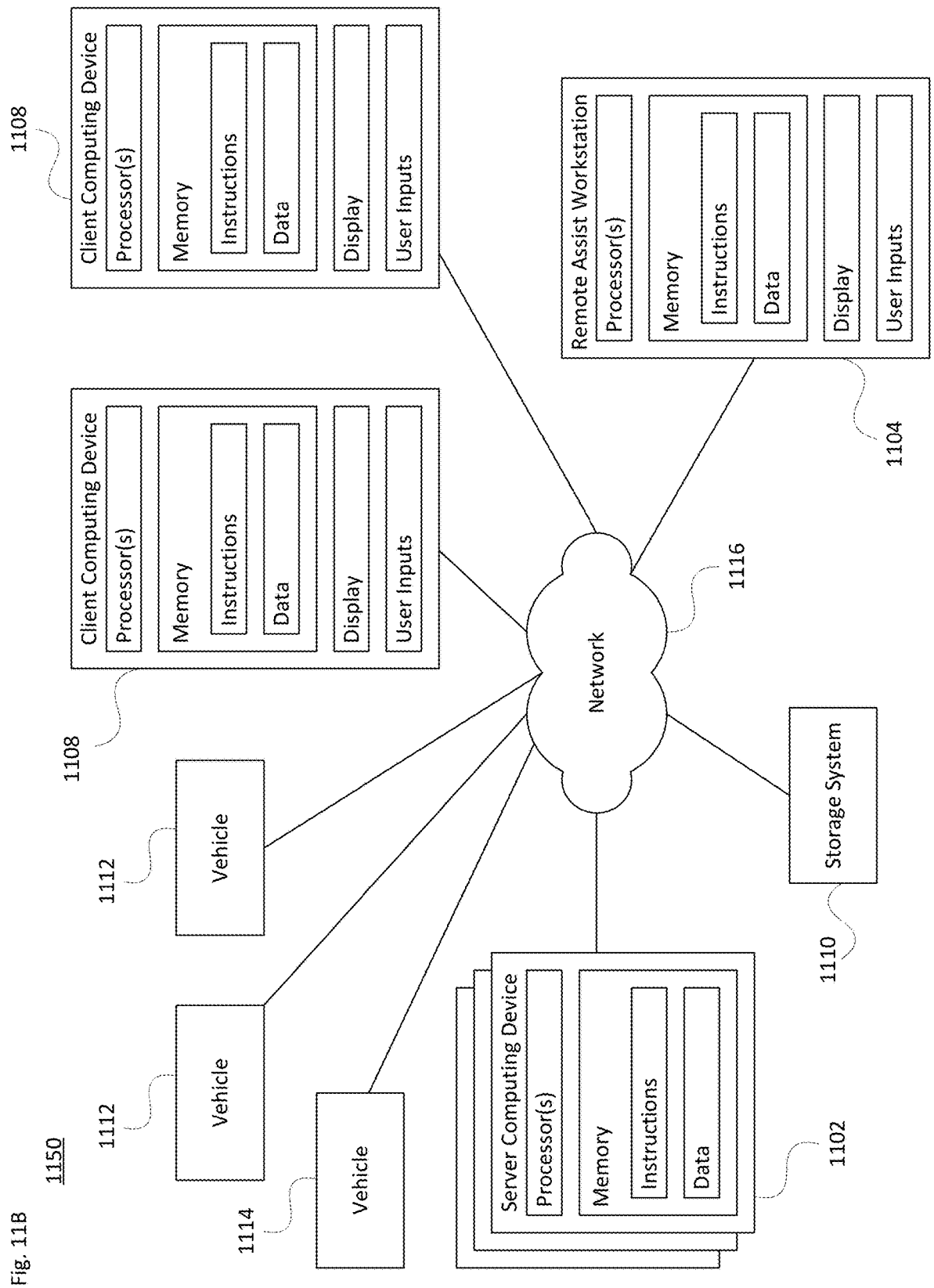

Information regarding jackknifing may also be shared with other vehicles, such as vehicles that are part of a fleet. This can be done to warn other vehicles about hazardous road conditions or places where jackknifing may occur or has occurred. One example of this is shown in FIGS. 11A and 11B. In particular, FIG. 11A is a pictorial diagram 1100 and FIG. 11B is a functional diagram 1150 of an example system that includes a plurality of computing devices 1102, 1104, 1106, 1108 and a storage system 1110 connected via a network 116. The system also includes vehicles 1112 and 1114, which may be configured the same as or similarly to vehicle 100 of FIGS. 1A-B or vehicle 120 of FIGS. 1C-D. Vehicles 1112 and/or vehicles 1114 may be part of a fleet of vehicles. Although only a few vehicles and computing devices are depicted for simplicity, a typical system may include significantly more.

As shown in FIG. 11B, each of computing devices 1102, 1104, 1106 and 1108 may include one or more processors, memory, data and instructions. Such processors, memories, data and instructions may be configured similarly to the ones described above with regard to FIG. 2A.

The various computing devices and vehicles may communication via one or more networks, such as network 1116. The network 1116, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1102 may include one or more server computing devices having a plurality of computing devices, e.g., a load balanced server farm, that exchange information with different nodes of a network for the purpose of receiving, processing and transmitting the data to and from other computing devices. For instance, computing device 1102 may include one or more server computing devices that are capable of communicating with the computing devices of vehicles 1112 and/or 1114, as well as computing devices 1104, 1106 and 1108 via the network 1116. For example, vehicles 1112 and/or 1114 may be a part of a fleet of vehicles that can be dispatched by a server computing device to various locations, and they may receive updated vehicle models to be used in maneuver and/or route planning. In this regard, the computing device 1102 may function as a dispatching server computing system which can be used to dispatch vehicles to different locations in order to pick up and deliver cargo or pick up and drop off passengers. In addition, server computing device 1102 may use network 1116 to transmit and present information to a user of one of the other computing devices or a passenger of a vehicle. In this regard, computing devices 1104, 1106 and 1108 may be considered client computing devices.

As shown in FIG. 11A each client computing device 1104, 1106 and 1108 may be a personal computing device intended for use by a respective user 1118, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1106 and 1108 may be mobile phones or devices such as a wireless-enabled PDA, a tablet PC, a wearable computing device (e.g., a smartwatch), or a netbook that is capable of obtaining information via the Internet or other networks.

In some examples, client computing device 1104 may be a remote assistance workstation used by an administrator or operator to communicate with passengers of dispatched vehicles. Although only a single remote assistance workstation 1104 is shown in FIGS. 11A-11B, any number of such workstations may be included in a given system. Moreover, although operations workstation is depicted as a desktop-type computer, operations works stations may include various types of personal computing devices such as laptops, netbooks, tablet computers, etc.

Storage system 1110 can be of any type of computerized storage capable of storing information accessible by the server computing devices 1102, such as a hard-drive, memory card, ROM, RAM, DVD, CD-ROM, flash drive and/or tape drive. In addition, storage system 1110 may include a distributed storage system where data is stored on a plurality of different storage devices which may be physically located at the same or different geographic locations. Storage system 1110 may be connected to the computing devices via the network 1116 as shown in FIGS. 11A-B, and/or may be directly connected to or incorporated into any of the computing devices.

Storage system 1110 may store various types of information. For instance, in addition to vehicle models for each type of vehicle in the fleet, the storage system 1110 may also store autonomous vehicle control software which is to be used by vehicles, such as vehicles 1112 or 1114, to operate such vehicles in an autonomous driving mode. This can include information regarding brake control in general, brake modulation profiles, etc. Storage system 1110 may also store map information, route information, weather information, etc. This information may be shared with the vehicles 1112 and 1114, for instance to help with real-time route planning, maneuver evaluation (including jackknifing mitigation) and selection by the on-board computer system(s). The remote assistance workstation 1104 may access the stored information and use it to assist operation of a single vehicle or a fleet of vehicles.

In a situation where there is a passenger or remote assistance personnel (e.g., a safety driver) in the vehicle, the vehicle or remote assistance workstation may communicate directly or indirectly with the person's client computing device. Here, for example, information may be provided to the person regarding current driving operations, changes to the route, special braking maneuvers, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. An articulated vehicle configured to operate in an autonomous driving mode, comprising:
   a driving system including a steering subsystem, an acceleration subsystem and a deceleration subsystem to control driving of the vehicle in the autonomous driving mode;
   a perception system including one or more sensors configured to detect objects in an environment surrounding the vehicle based on obtained sensor data, each of the one or more sensors being positioned along the vehicle; and
   a control system operatively connected to the driving system and the perception system, the control system having one or more computer processors configured to:
      receive sensor data from the perception system, the sensor data being associated with information regarding different parts of the vehicle;
      determine a current behavior of the vehicle based on the received sensor data, the current behavior indicating an orientational relationship between the different parts of the vehicle;
      determine an expected behavior of the vehicle based on at least on a model of the vehicle and a planned route;
      compare the expected behavior to the current behavior to identify whether there is a match;
      upon a determination that there is no match between the expected behavior and the current behavior, determine whether there is an actual or expected jackknifing situation;
      determine a type of the jackknifing situation;
      based on the type of the jackknifing situation, select one or more mechanisms of the deceleration subsystem to cause vehicle braking; and
      actuate the one or more mechanisms to cause the vehicle braking.

2. The articulated vehicle of claim 1, wherein the articulated vehicle is a cargo vehicle having a tractor and at least one trailer pivotally coupled to the tractor.

3. The articulated vehicle of claim 1, wherein the determination that there is no match includes a determination that the expected behavior deviates beyond a threshold amount from the current behavior.

4. The articulated vehicle of claim 1, wherein the determination of the type of jackknifing situation is a determination of either a tractor jackknifing situation or a trailer jackknifing situation.

5. The articulated vehicle of claim 1, wherein the determination of the expected behavior of the vehicle is further based on at least one of map information, weather information, one or more driving commands, or a desired vehicle state.

6. The articulated vehicle of claim 5, wherein the one or more driving commands are analyzed over a selected period of time.

7. The articulated vehicle of claim 5, wherein the desired vehicle state includes at least one of a planned speed or a planned vehicle pose for a road segment.

8. The articulated vehicle of claim 1, wherein the one or more mechanisms of the deceleration subsystem are configured to cause the vehicle braking to address a trailer jackknifing situation, and the one or more mechanisms includes at least two pneumatic input ports that are connected to a trailer service line and a trailer supply, and at least one pneumatic output port that is connected to the trailer service line.

9. The articulated vehicle of claim 1, wherein the one or more mechanisms of the deceleration subsystem comprise a pair of mechanisms that are configured to cause the vehicle braking to address a trailer jackknifing situation, and the pair of mechanisms has:
   a first mechanism including at least two pneumatic input ports that are connected to a trailer service line and a trailer supply, and at least one pneumatic output port that is connected to the trailer service line, and
   a second mechanism including (i) at least four pneumatic input ports that are connected to primary and secondary outputs of a treadle valve, a primary reservoir and a secondary reservoir, and (ii) at least two pneumatic output ports that are connected to primary and secondary brake circuits;
   wherein the first and second mechanisms are configured to modulate service pressure delivered to a trailer brake system of the deceleration subsystem independently of tractor brake pressure.

10. The articulated vehicle of claim 9, wherein the first and second mechanisms are configured for serial operation to modulate the service pressure in response to a tractor jackknifing situation.

11. The articulated vehicle of claim 9, wherein the modulation includes any of (1) stopping brake pressure the trailer, (2) reduce the brake pressure to the trailer, or (3) using a selected signal shape for the pressure.

12. The articulated vehicle of claim 1, wherein the control system is further configured to determine a desired pressure for trailer braking of the deceleration subsystem based on wheel speeds of one or more trailer tires.

13. The articulated vehicle of claim 12, wherein the control system is further configured to:
   observe locking of the one or more trailer tires; and
   cause the deceleration subsystem to dump pressure to unlock the locked trailer tires.

14. The articulated vehicle of claim 1, wherein the control system is further configured to:
   evaluate actuation of the one or more mechanisms;
   determine a reaction of a trailer section of the vehicle; and
   adjust the actuation of the one or more mechanisms in response to the determined reaction.

15. A method of controlling an articulated vehicle configured to operate in an autonomous driving mode, the vehicle including a driving system having a steering subsystem, an acceleration subsystem and a deceleration subsystem to control driving of the vehicle in the autonomous driving mode, the method comprising:
   receiving, by a control system of the vehicle, sensor data from a perception system of the vehicle, the sensor data being associated with information regarding different parts of the vehicle;
   determining, by the control system, a current behavior of the vehicle based on the received sensor data, the current behavior indicating an orientational relationship between the different parts of the vehicle;
   determining, by the control system, an expected behavior of the vehicle based on at least on a model of the vehicle and a planned route;
   comparing, by the control system, the expected behavior to the current behavior to identify whether there is a match;
   upon a determining that there is no match between the expected behavior and the current behavior, determining whether there is an actual or expected jackknifing situation;

determining, by the control system, a type of the jackknifing situation;

based on the type of the jackknifing situation, selecting one or more mechanisms of the deceleration subsystem to cause vehicle braking; and actuating the one or more mechanisms to cause the vehicle braking.

16. The method of controlling an articulated vehicle of claim 15, wherein determining the type of jackknifing situation comprises determining either a tractor jackknifing situation or a trailer jackknifing situation.

17. The method of controlling an articulated vehicle of claim 15, wherein determining the expected behavior of the vehicle is further based on at least one of map information, weather information, one or more driving commands, or a desired vehicle state.

18. The method of controlling an articulated vehicle of claim 15, wherein the orientational relationship between the different parts of the vehicle includes orientation information about current states of different sections of the vehicle according to one or more of position, roll, pitch, yaw, or time derivatives thereof.

19. The method of controlling an articulated vehicle of claim 15, wherein the one or more mechanisms are selected for modulation of service pressure delivered to a trailer brake system of the deceleration subsystem independently of tractor brake pressure.

20. The method of controlling an articulated vehicle of claim 19, wherein:

the one or more mechanisms comprise a pair of mechanisms; and modulation of the service pressure includes sequentially activating the pair of mechanisms to cause the vehicle braking.

* * * * *